United States Patent
Matsuda

(10) Patent No.: US 8,560,199 B2
(45) Date of Patent: Oct. 15, 2013

(54) CONTROL SYSTEM IN VEHICLE, WHEELIE DETERMINING METHOD, AND DRIVING POWER SUPPRESSING METHOD

(75) Inventor: Yoshimoto Matsuda, Kobe (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 369 days.

(21) Appl. No.: 12/974,413

(22) Filed: Dec. 21, 2010

(65) Prior Publication Data

US 2011/0160973 A1    Jun. 30, 2011

(30) Foreign Application Priority Data

Dec. 28, 2009  (JP) .................. 2009-297940

(51) Int. Cl.
*F02D 11/06*  (2006.01)

(52) U.S. Cl.
USPC .......... 701/70; 701/36; 701/69; 701/93; 701/99; 701/101; 701/107; 701/110; 280/5.5; 180/282; 180/279

(58) Field of Classification Search
USPC .......... 180/282, 279; 701/36–39, 69–75, 701/93–99, 101, 107, 110; 280/5.5, 5.513
See application file for complete search history.

(56) References Cited

U.S. PATENT DOCUMENTS

2006/0219455 A1* 10/2006 Watanabe et al. ............. 180/219

FOREIGN PATENT DOCUMENTS

| JP | 2002-070709 A | 3/2002 |
| JP | 2008189127 A | 8/2008 |
| JP | 2009214855 A | 9/2009 |

* cited by examiner

Primary Examiner — Thomas Tarcza
Assistant Examiner — Adam Tissot
(74) Attorney, Agent, or Firm — Alleman Hall McCoy Russell & Tuttle, LLP

(57) ABSTRACT

A control system in a vehicle including a front wheel which is a driven wheel and a rear wheel which is a drive wheel, the control system including: a control unit configured to control a driving power generated in a driving source according to a driving state of the vehicle; and a front wheel speed sensor configured to detect a rotational speed of the front wheel; the control unit including: a wheelie determiner configured to determine whether or not a predetermined wheelie starting condition is met, based on a value detected by the front wheel speed sensor; and a driving power controller configured to suppress the driving power if the wheelie determiner determines that the predetermined wheelie starting condition is met.

11 Claims, 17 Drawing Sheets

CONTROL SYSTEM IN VEHICLE, WHEELIE DETERMINING METHOD, AND DRIVING POWER SUPPRESSING METHOD

CROSS REFERENCE TO RELATED APPLICATION

This application claims priority to and the benefit of Japanese Patent Application No. 2009-297940, filed on Dec. 28, 2009, the entire disclosure of which is incorporated herein by reference.

BACKGROUND OF THE INVENTION

1. Field of the Invention

The present invention relates to a control system in a rear-wheel-drive vehicle, a method of determining whether or not a wheelie has occurred in the rear-wheel-drive vehicle and a method of suppressing driving power generated in a driving source in the vehicle.

2. Description of the Related Art

In rear-wheel-drive vehicles such as motorcycles, a wheelie sometimes occurs when a high engine driving power is transmitted to a rear wheel. Japanese Laid-Open Patent Application Publication No. 2002-70709 discloses a control system in a motorcycle for controlling an engine to reduce an engine driving power upon the wheelie starting.

A conventional control system includes an acceleration sensor. When a wheelie is occurring, a vehicle body of the motorcycle is tilted such that a front wheel lifts off the ground. For this reason, a gravitational force component of acceleration, detected by the acceleration sensor, becomes larger when the wheelie is occurring than when the motorcycle is driving normally. The conventional control system utilizes this phenomenon and determines that the wheelie is occurring if the acceleration detected by the acceleration sensor is not less than (i.e., is greater than or equal to) a predetermined value. During a period when it is determined that the wheelie is occurring, the control system suppresses the engine driving power based on an output of the acceleration sensor. When the acceleration is less than the predetermined value, the control system determines that the wheelie is not occurring.

However, the output of the acceleration sensor contains noise. During driving, the vehicle body vibrates due to an engine operation and bumps and depressions on a road surface, which results in a fluctuation in the gravitational force component of the detected acceleration. The gravitational force component of the detected acceleration also fluctuates due to a slope of the road surface. For this reason, it is difficult to accurately detect whether or not the wheelie is occurring in the conventional control system using the acceleration sensor. As a result, it is difficult to properly suppress an engine driving power, as desired, in the conventional control system.

SUMMARY OF THE INVENTION

According to an aspect of the present invention, a control system in a vehicle including a front wheel which is a driven wheel and a rear wheel which is a drive wheel, the control system including: a control unit configured to control a driving power generated in a driving source according to a driving state of the vehicle; and a front wheel speed sensor configured to detect a rotational speed of the front wheel; the control unit including: a wheelie determiner configured to determine whether or not a predetermined wheelie starting condition is met, based on a value detected by the front wheel speed sensor; and a driving power controller configured to suppress the driving power if the wheelie determiner determines that the predetermined wheelie starting condition is met.

In accordance with this configuration, it is determined whether or not the wheelie has started based on the value detected by the front wheel speed sensor for detecting the rotational speed of the front wheel. Since the value detected by the front wheel speed sensor is less likely to contain noise due to vibration of a vehicle body and a slope of a road surface than a value detected by an acceleration sensor, it is possible to determine whether or not the wheelie has started more accurately in the control system of the present invention than in a control system configured to determine whether or not the wheelie has started using an acceleration sensor.

According to another aspect of the present invention, a method of determining whether or not a wheelie has occurred in a vehicle including a front wheel which is a driven wheel and a rear wheel which is a drive wheel, the method comprising: a front wheel speed detecting step for detecting a rotational speed of the front wheel; a change value calculating step for calculating a change value of the rotational speed of the front wheel which is detected in the front wheel speed detecting step; and a wheelie determination step for determining whether or not the wheelie has started based on the change value calculated in the change value calculating step.

In accordance with this method, the rotational speed of the front wheel is detected, the change value of the rotational speed of the front wheel is calculated, and it is determined whether or not the wheelie has started based on the calculated change value. In this method, it is determined more accurately whether or not the wheelie has started based on a value which does not contain noise caused by the vibration of the vehicle body and the slope of the road surface.

According to another aspect of the present invention, a method of suppressing a driving power generated in a driving source when a wheelie is occurring in a vehicle including a front wheel which is a driven wheel and a rear wheel which is a drive wheel, the method comprising: a front wheel speed detecting step for detecting a rotational speed of the front wheel; a change value calculating step for calculating a change value of the rotational speed of the front wheel which is detected in the front wheel speed detecting step; and a suppressed state deciding step for deciding a suppressed state of the driving power based the change value calculated in the change value calculating step.

In accordance with this method, the suppressed state of the driving power at the occurrence of the wheelie is decided based on the change value of the rotational speed of the front wheel. In this method, the driving power can be suppressed more properly based on a value which does not contain noise caused by the vibration of the vehicle body and the slope of the road surface than in the conventional method using the value detected by the acceleration sensor.

The above and further objects, features and advantages of the present invention will more fully be apparent from the following detailed description of preferred embodiments with accompanying drawings.

DETAILED DESCRIPTION OF THE PREFERRED EMBODIMENTS

Hereinafter, embodiments of the present invention will be described with reference to the drawings. A motorcycle will be descried as an example of a vehicle including a control system according to the embodiments of the present invention. The stated directions are referenced from the perspective of a driver straddling the motorcycle unless otherwise explicitly noted.

(Embodiment 1)

Figure 1:
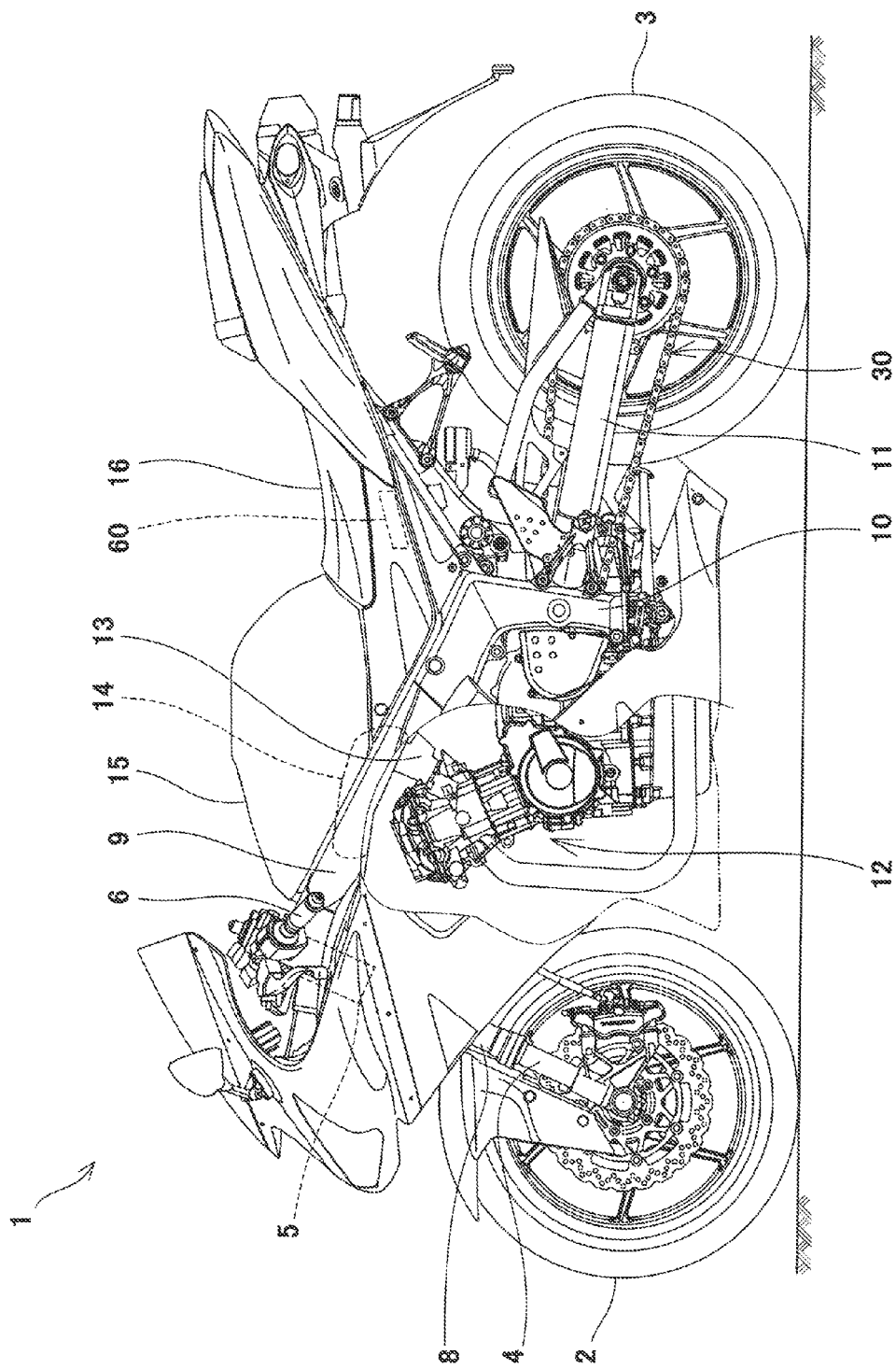
FIG. 1 is a left side view of a motorcycle which is an exemplary vehicle including a control system according to Embodiment 1 of the present invention.

FIG. 1 is a left side view of a motorcycle 1 which is an exemplary vehicle including a control system according to Embodiment 1 of the present invention. Referring to FIG. 1, the motorcycle 1 includes a front wheel 2 which is a driven wheel at a front and a rear wheel 3 which is a drive wheel at a rear. The front wheel 2 is rotatably attached to a lower end portion of a front fork 4, which is extended substantially vertically. An upper end portion of the front fork 4 is coupled to a steering shaft (not shown) rotatably supported by a head pipe 5. An upper end portion of the steering shaft is coupled to a handle 6 having a pair of right and left grip members.

A front suspension 8 is provided at the front fork 4 such that the front suspension 8 is extendable and contractible. When a load is applied from a road surface to a vehicle body via the front wheel 2, the front suspension 8 is contracted to mitigate the load.

A pair of right and left main frame members 9 extend downward in a rearward direction from the head pipe 5. A pair of right and left pivot frame members 10 are coupled to rear portions of the main frame members 9, respectively. Swing arms 11 are pivotally attached at their front end portions to the pivot frame members 10, respectively such that the swing arms 11 extend substantially in a longitudinal direction of the vehicle body. The rear wheel 3 is rotatably attached to the rear end portions of the swing arms 11.

A reciprocating four-stroke inline four-cylinder engine 12 is mounted to the main frame members 9 and the pivot frame members 10 and uses gasoline as a fuel. The engine 12 is a driving source for generating a driving power for moving the motorcycle 1. An air cleaner 14 is coupled to the engine 12 via a throttle device 13. Fresh air is taken into the engine 12 via the air cleaner 14 and the throttle device 13. A fuel tank 15 is disposed above the engine 12 and behind the handle 6. The fuel tank 15 stores fuel to be supplied to the engine 12. A driving power generated in the engine 12 (hereinafter also referred to as an engine driving power) is transmitted to the rear wheel 3 via a driving power transmission path 30, causing the rear wheel 3 to rotate. When the rear wheel 3 rotates on the road surface, the front wheel 2 contacting the road surface rotates along with the rear wheel 3 to start motorcycle 1 driving on the road surface.

A straddle seat 16, which is straddled by the driver, is provided behind the fuel tank 15. The driver is seated on the seat 16 and grips right and left grip members of the handle 6 to steer the motorcycle 1. When the driver gripping the grip members rotates the handle 6, the front wheel 2 turns around the steering shaft as a rotational shaft. A right grip member is a throttle grip 7 (see FIG. 2). The driver rotates the throttle grip 7 to operate the throttle device 13.

Figure 2:
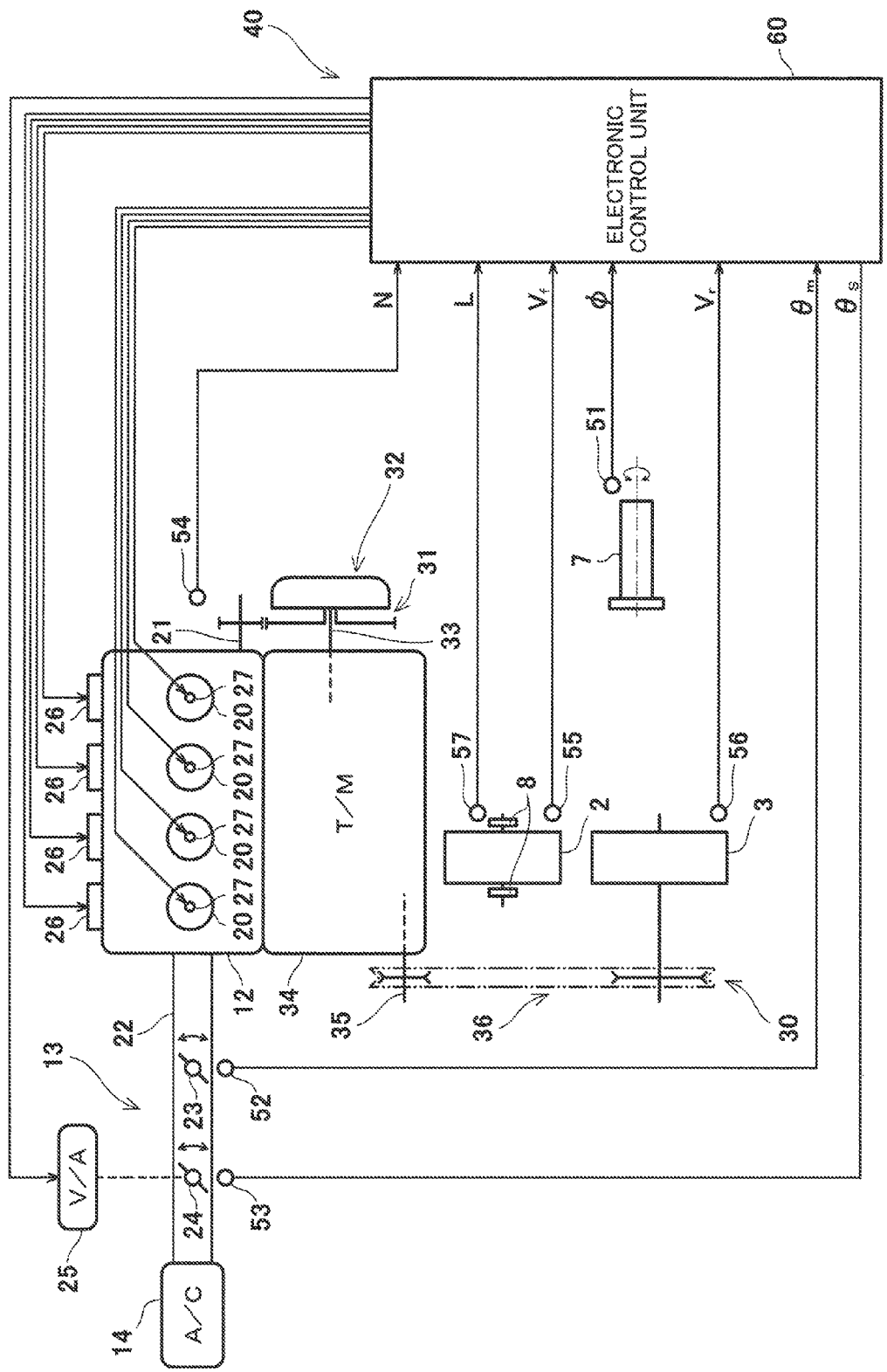
FIG. 2 is a conceptual view showing a configuration of a driving system and a control system in the motorcycle in FIG. 1.

FIG. 2 is a conceptual view showing a configuration of a driving system and a control system 40 in the motorcycle 1 in FIG. 1. Referring to FIG. 2, the engine 12 includes four cylinders 20. In each of cylinders 20, a piston (not shown) reciprocates while a series of operations including an intake stroke, a compression stroke, an expansion stroke and an exhaust stroke are repeated. The reciprocating movement of each piston is converted into a rotational movement of a crankshaft 21. Thus, the driving power generated in the engine 12 is an output of rotation of the crankshaft 21.

The throttle device 13 coupled to the engine 12 includes an air-intake pipe 22 forming an air-intake passage inside thereof, a main throttle valve 23 and a sub-throttle valve 24 which are configured to open and close the air-intake passage such that their opening degrees are variable, and a valve actuator 25 configured to drive the sub-throttle valve 24. The opening degree of main throttle valve 23 is changed according to an operation position of the throttle grip 7 via a throttle wire coupling the throttle grip 7 to the main throttle valve 23. The valve actuator 25 is constituted by, for example, an electric motor. When the valve actuator 25 is actuated, the opening degree of the sub-throttle valve 24 is changed. According to a change in the opening degree, an air-intake amount in the air-intake passage changes. Although the throttle device 13 includes the main throttle valve 23 which is a mechanicallydriven throttle valve and the sub-throttle valve 24 which is an electrically-driven throttle valve, only one of them may be provided.

The engine 12 includes a fuel feeder 26 for feeding or injecting a fuel and an igniter 27 for igniting an air-fuel mixture at suitable timings, for each of cylinders 20. When the throttle valves 23 and 24 are opened to greater opening degrees, each fuel feeder 26 feeds a greater amount of fuel, and the air-fuel mixture is ignited at earlier timings, resulting in a higher driving power being generated in the engine 12.

The driving power generated in the engine 12 (i.e., the rotation of the crankshaft 21) is transmitted to the rear wheel 3 via the driving power transmission path 30. In this embodiment, on the driving power transmission path 30 a reduction gear mechanism 31, a clutch mechanism 32, a transmission input shaft 33, a transmission 34, a transmission output shaft 35, and a chain transmission mechanism 36, are provided. In a state where the clutch mechanism 32 is disengaged or the transmission 34 is in a neutral gear position, the engine driving power is inhibited from being transmitted through the driving power transmission path 30.

Referring to FIG. 2, the control system 40 of the motorcycle 1 includes an electronic control unit 60 configured to control the engine driving power according to a driving state of the motorcycle 1. The valve actuator 25 of the throttle device 13, the fuel feeders 26, and the igniters 27 are coupled to the electronic control unit 60, to control the engine driving power. A plurality of sensors, described below, are coupled to the electronic control unit 60 to detect the driving state of the motorcycle 1.

As depicted in FIG. 2, the plurality of sensors includes a grip position sensor 51 for detecting an operation position (hereinafter referred to as grip position) $\phi$ of the throttle grip 7, a main throttle valve position sensor 52 for detecting an opening degree $\theta_m$ of the main throttle valve 23, a sub-throttle valve position sensor 53 for detecting an opening degree $\theta_s$ of the sub-throttle valve 24, an engine speed sensor 54 for detecting an engine speed N, a front wheel speed sensor 55 for detecting a rotational speed $V_f$ of the front wheel 2, a rear wheel speed sensor 56 for detecting a rotational speed $V_r$ of the rear wheel 3, and a stroke sensor 57 for detecting a stroke L of the front suspension 8. Signals detected by the front wheel speed sensor 55 and the rear wheel speed sensor 56 are less likely to contain noise, even when an external force such as vibration is applied to the front and rear wheels 2 and 3 and the vehicle body. The front wheel speed sensor 55 and the rear wheel speed sensor 56 may be, for example, electromagnetic pick-up sensors.

The rear wheel speed sensor 56 is not limited to a sensor for directly detecting the rotational speed $V_r$ of the rear wheel 3, but may be a sensor configured to detect a rotational speed from which the electronic control unit 60 can calculate the rotational speed $V_r$ of the rear wheel 3. To be precise, the rear wheel speed sensor 56 may be a sensor configured to detect a rotational speed of a component or a member which is positioned between the rear wheel 3 and a mechanism (in this embodiment, transmission 34) disposed in close proximity to the rear wheel 3, among mechanisms which can inhibit the driving power from being transmitted through the driving power transmission path 30, among components or members provided on the driving power transmission path 30. Alternatively, the rotational speed $V_r$ of the rear wheel 3 may be calculated by multiplying the engine speed by a reduction gear ratio. As should be appreciated from this, any sensor configured to detect the rotational speed of a driving power transmission member, component or mechanism, which is positioned between the driving power source (engine 12) and the rear wheel 3 may be used to derive the rotational speed $V_r$ of the rear wheel 3.

Figure 3:
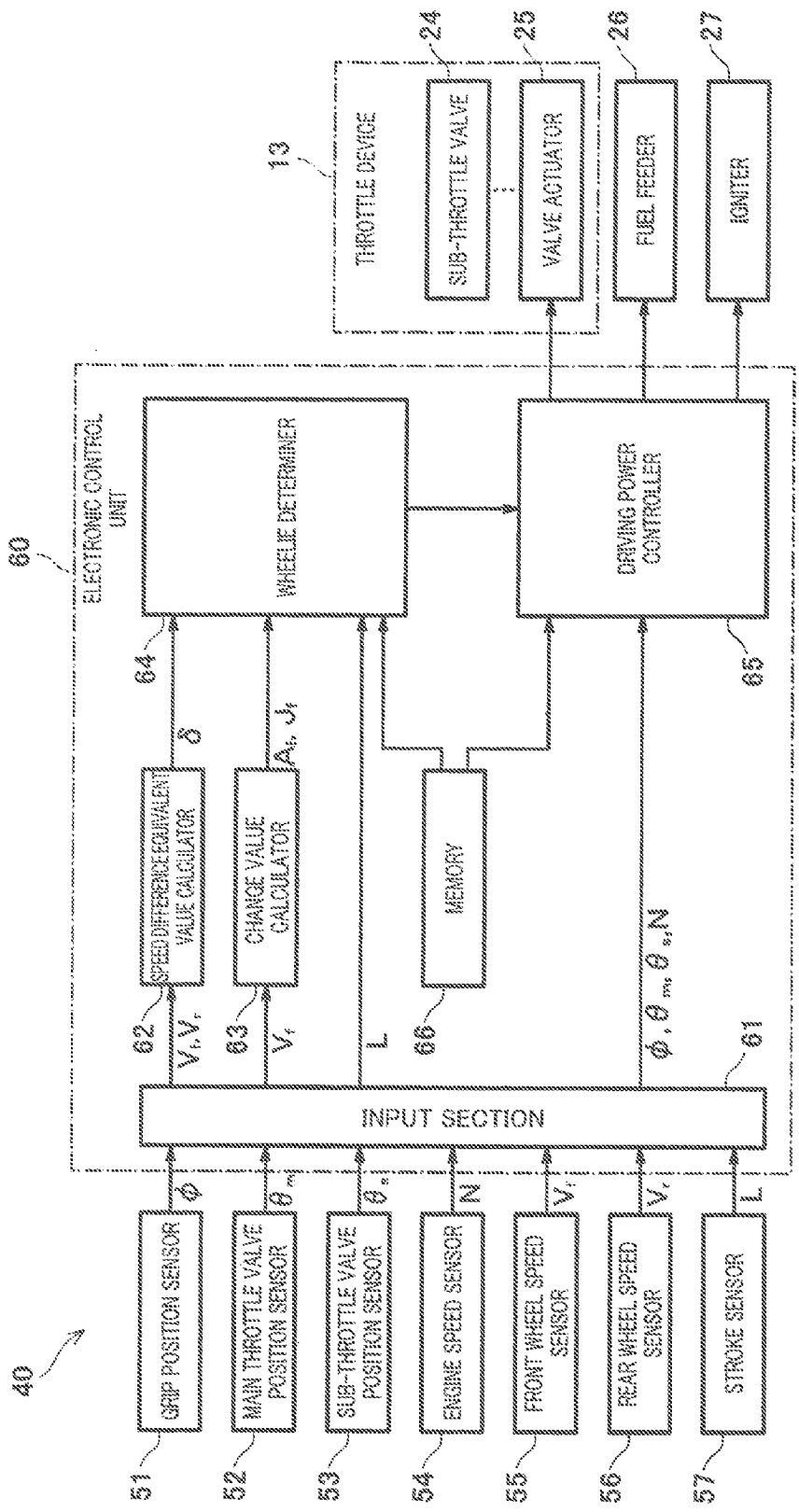
FIG. 3 is a block diagram showing a configuration of the control system in FIG. 2.

FIG. 3 is a block diagram showing a configuration of the control system 40 of FIG. 2. Referring to FIG. 3, the electronic control unit 60 includes an input section 61 which receives as inputs detected values from the sensors 51 to 57. The input section 61 receives as inputs the detected values from the sensors 51 to 57 in every predetermined minute sampling cycle (e.g., 5 msec). The input detected values are used in processes executed by a speed difference equivalent value calculator 62, a change value calculator 63, a wheelie determiner 64, and a driving power controller 65.

The speed difference equivalent value calculator 62 is configured to calculate a speed difference equivalent value $\delta$ which is a value equivalent to a speed difference between the front wheel 2 and the rear wheel 3 based on the value $V_f$ detected by the front wheel speed sensor 55 and the value $V_r$ detected by the rear wheel speed sensor 56. The speed difference equivalent value $\delta$ may be calculated by subtracting the value $V_f$ detected by the front wheel speed sensor 55 from the value $V_r$ detected by the rear wheel speed sensor 56, which values are detected at the same time point ($\delta = V_r - V_f$). Alternatively, the speed difference equivalent value $\delta$ may be calculated by dividing the subtracted value by the value $V_r$ detected by the rear wheel speed sensor 56 ($\delta = (Y_r - V_f)/V_r$).

The change value calculator 63 is configured to calculate a value (change value) indicating a change of the rotational speed of the front wheel 2, by differentiating the rotational speed $V_f$ of the front wheel 2 by time, one or more times, based on the value $V_f$ detected by the front wheel speed sensor 55. The change value may be a rotational acceleration $A_f$ of the front wheel 2 obtained by differentiating the rotational speed $V_f$ of the front wheel 2 by time, one time, or may be a rotational jerk $J_f$ of the front wheel 2 obtained by differentiating the rotational speed $V_f$ of the front wheel 2 by time, two times.

Figure 4A:
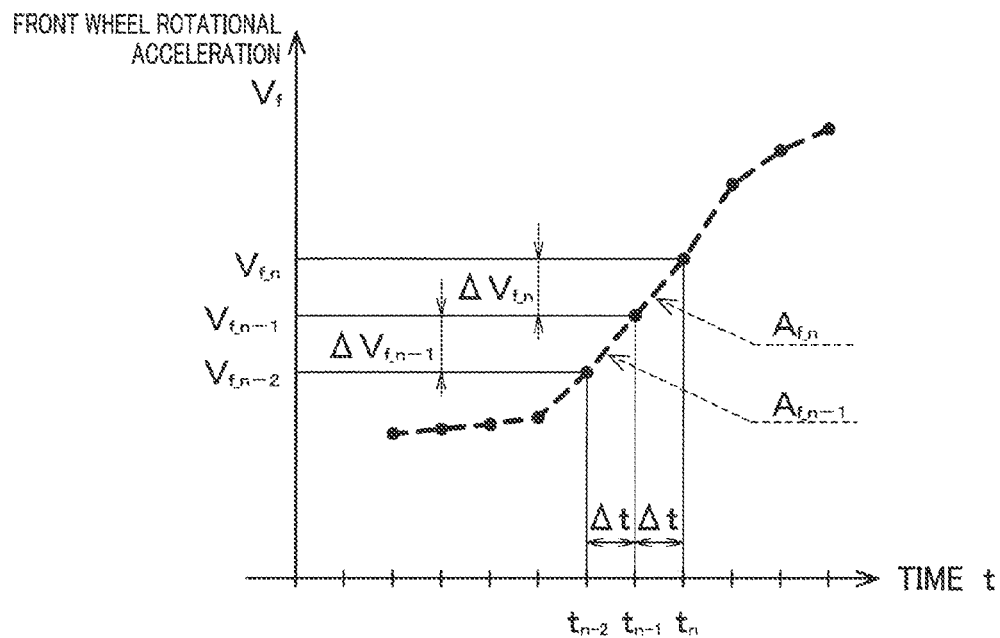
FIG. 4A is a graph showing a process for calculating a change value of a rotational speed of a front wheel which is executed by a change value calculator in FIG. 3 and is a graph showing a process for calculating a rotational acceleration of the front wheel.
Figure 4B:
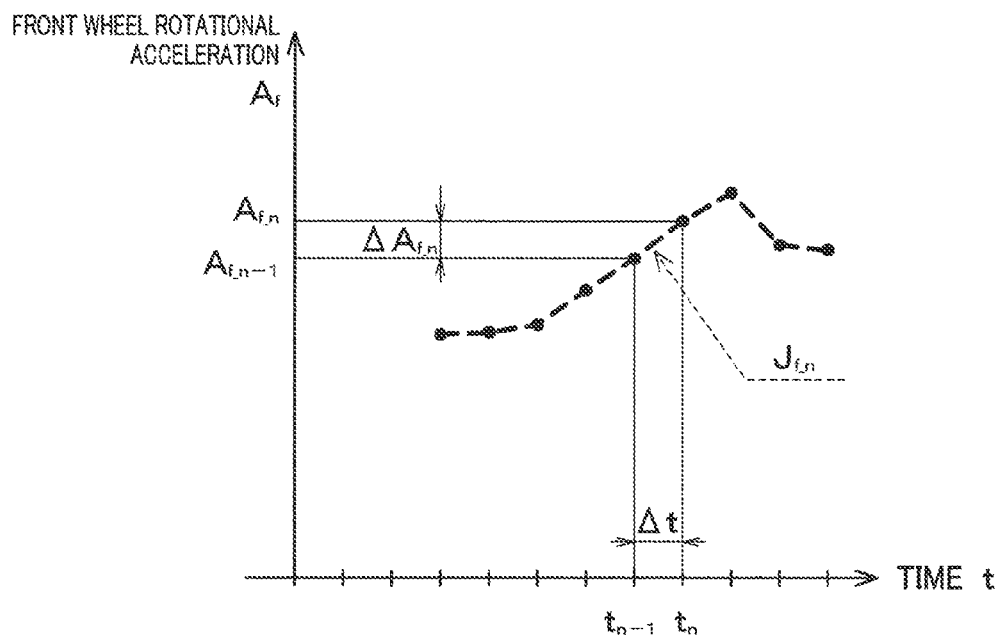
FIG. 4B is a graph showing a process for calculating a change value of the rotational speed of the front wheel which is executed by the change value calculator in FIG. 3 and is a graph showing a process for calculating a rotational jerk of the front wheel.

FIGS. 4A and 4B are graphs showing the process for calculating a change value of the rotational speed $V_f$ of the front wheel 2 which is executed by the change value calculator 63 in FIG. 3, in a state where the motorcycle 1 is accelerated and a wheelie is not occurring in the motorcycle 1. In FIG. 4A, a vertical axis indicates the value $V_f$ detected by the front wheel speed sensor 55. In FIG. 4B, a vertical axis indicates the rotational acceleration $A_f$ of the front wheel 2 obtained by the value $V_f$ detected by the front wheel speed sensor 55.

A rotational acceleration $A_{f\_n}$ at a time point $t_n$ is calculated by dividing a difference $\Delta V_{f\_n}$ of the rotational speed of the front wheel 2 by the sampling cycle $\Delta t$ ($A_{f\_n} = \Delta V_{f\_n}/\Delta t$). The rotational speed difference $\Delta V_{f\_n}$ is calculated by subtracting a value $V_{f\_n-1}$ detected by the front wheel speed sensor 55 which is input at a time point $t_{n-1}$ which is one cycle before the time point $t_n$, from the value $V_{f\_n}$ detected by the front wheel speed sensor 55 which is input at the time point $t_n$ ($\Delta V_{f\_n} = V_{f\_n} - V_{f\_n-1}$). In this way, the rotational acceleration $A_{f\_n}$ is calculated based on the two values $V_{f\_n}$ and $V_{f\_n-1}$ detected by the front wheel speed sensor 55 ($A_{f\_n} = (V_{f\_n} - V_{f\_n-1})/\Delta t$)).

A rotational jerk $J_f$ at a time point $t_n$ is calculated by dividing the rotational acceleration difference $\Delta A_{f\_n}$ of the front wheel 2 by the sampling cycle $\Delta t$ ($J_{f\_n} = \Delta A_{f\_n}/\Delta t$). The rotational acceleration difference $\Delta A_{f\_n}$ is calculated by subtracting rotational acceleration $A_{f\_n-1}$ calculated at a time point $t_{n-1}$ which is one cycle before the time point $t_n$ from the rotational acceleration $A_{f\_n}$ calculated at the time point $t_n$ ($\Delta A_{f\_n} = A_{f\_n}$. In this way, the rotational jerk $J_{f\_n}$ is calculated based on the three values $V_{f\_n}$, $V_{f\_n-1}$, and $V_{f\_n-2}$, which are detected by the front wheel speed sensor 55 ($J_{f\_n}=(A_{f\_n}-A_{f\_n-1})/\Delta t=\{(V_{f\_n}-V_{f\_n-1})-(V_{f\_n-1}-V_{f\_n-2})\}/\Delta t^2$).

Turning back to FIG. 3, the wheelie determiner 64 determines whether or not a predetermined wheelie starting condition is met according to the value calculated by the speed difference equivalent value calculator 62 and the value detected by the change value calculator 63, based on the value $V_f$ detected by the front wheel speed sensor 55 and the value $V_r$ detected by the rear wheel speed sensor 56.

The driving power controller 65 controls the valve actuator 25 of the throttle device 13, and each fuel feeder 26 and igniter 27, to thereby suppress the engine driving power. If the wheelie determiner 64 determines that the wheelie starting condition is met, the driving power controller 65 suppresses the engine driving power. Hereinafter, the driving power suppressing control executed in conjunction with the wheelie will be described. In FIGS. 1 to 3, the same constituents are designated by the same reference numerals.

Figure 5:
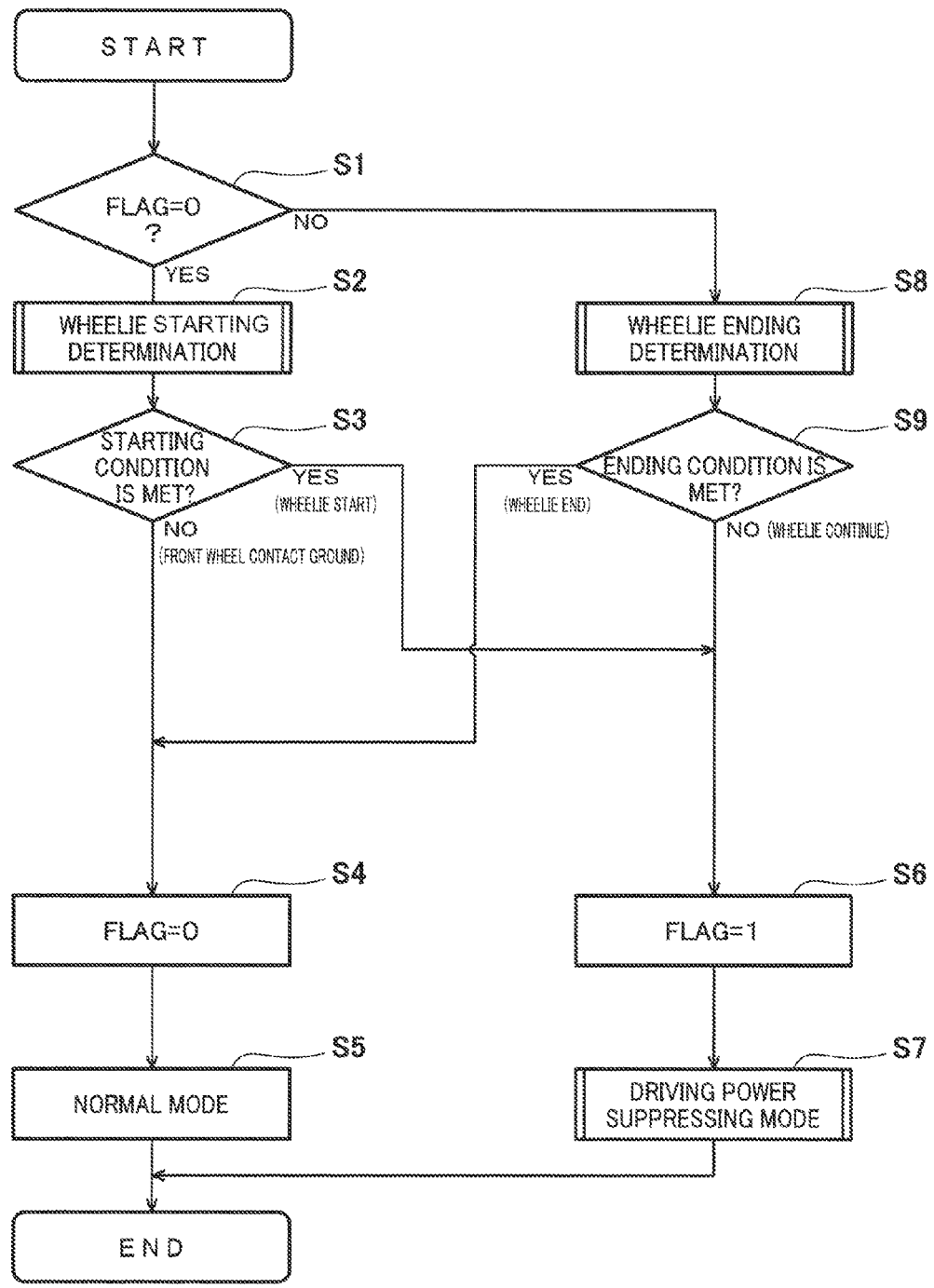
FIG. 5 is a flowchart showing a flow of a main control process executed by an electronic control unit in FIG. 3.

FIG. 5 is a flowchart showing a flow of a main control process executed by the electronic control unit 60 in FIG. 3. The flow shown in FIG. 5 is repeated in every sampling cycle (e.g., 5 msec) during driving of the motorcycle 1.

Initially, it is determined whether or not a flag value is 0 (a zero value indicates a wheelie is not occurring) based on previous determination result (S1). If it is determined that the flag value is 0 (i.e., wheelie is not occurring) (S1: YES), the wheelie determiner 64 determines whether or not a predetermined wheelie starting condition is met (hereinafter also referred to as wheelie starting determination) (S2). If it is determined that the predetermined wheelie starting condition is not met (S3: NO), the flag value is maintained at 0 (S4) and the driving power controller 65 controls the engine driving power in a normal mode (S5). Thus, the present process flow ends.

In the normal mode (S5), the driving power controller 65 decides a target opening degree of the sub-throttle valve 24 according to a value ϕ detected by the grip position sensor 51 which is input to the input section 61, with reference to an opening degree map stored in the memory 66, decides an operation amount of the valve actuator 25 so that an actual opening degree $\theta_s$ of the sub-throttle valve 24 reaches the target opening degree, and causes the valve actuator 25 to move by the operation amount.

The driving power controller 65 decides a target fuel amount based on the value ϕ detected by the grip position sensor 51 and an engine speed N detected by the engine speed sensor 54, etc., with reference to a fuel amount map stored in the memory 66. The driving power controller 65 also controls each fuel feeder 26 so that the fuel is fed to each of cylinders 20 with the target fuel amount at a suitable timing. The driving power controller 65 decides a target timing based on the value ϕ detected by the grip position sensor 51 and the engine speed N detected by the engine speed sensor 54, etc, which are input to the input section 61, with reference to a timing map stored in the memory 66. The driving power controller 65 then causes each igniter 27 to ignite the air-fuel mixture at the target timing.

The driving power controller 65 selects one from among a plurality ignition patterns stored in the memory 66 and causes each igniter 27 to ignite and combust the air-fuel mixture according to the selected ignition pattern. According to this ignition pattern, a cylinder in which ignition and expansion are performed and a cylinder in which ignition and expansion are paused, during a period in which the crankshaft 21 is rotating a predetermined crank angle, are decided. In this way, an ignition frequency is decided. For example, if an ignition pattern with an ignition frequency of 80% is referred to, ignition and expansion are actually performed four times and ignition and expansion are paused once during a period when the crankshaft 21 is rotating 900 degrees, although ignition and expansion should occur five times during that period. In the normal mode (S5), pause of ignition and expansion does not occur with reference to an ignition pattern with an ignition frequency of 100%.

When it is determined that the wheelie starting condition is not met and the process flow ends, a next process flow starts with the flag value being 0, and step 51, step S2 and step S3 are performed.

If it is determined that the wheelie starting condition is met (S3: YES), the flag value becomes 1 (S6), and the driving power controller 65 suppresses the engine driving power in a driving power suppressing mode (S7), and the present process flow ends. As described later, when the engine driving power is suppressed in the driving power suppressing mode, the engine driving power is less than in the normal mode. In a method of reducing the engine driving power after it is determined that wheelie has occurred, an engine control technique may be employed, in which the throttle valve opening degree is reduced, ignition timing is retarded, ignition in cylinder is paused, a fuel injection amount is reduced, etc.

When the wheelie starting condition is met and the process flow ends, a next process flows starts with the flag value being 1. If it is determined as NO in step S1 (S1: NO), and the wheelie determiner 64 determines whether or not a predetermined wheelie ending condition is met (hereinafter also referred to as wheelie ending determination) (S8).

If it is determined that the wheelie ending condition is not met in the wheelie ending determination (S8) (S9: NO), the flag value is maintained at 1 (S6), the engine driving power controller 65 continues a state in which the engine driving power is suppressed in the driving power suppressing mode (S7), and the present process flow ends. When it is determined that the wheelie ending condition is not met and the process ends, a next process flow starts with the flag value being 0, and step S1, step S8 and step S9 are performed.

On the other hand, if it is determined that the wheelie ending condition is met (S9: YES), the flag value becomes 0 (S4), the driving power controller 65 returns to the normal mode (S5), and the present process flow ends. When it is determined that the wheelie ending condition is met and the process flow ends, a next process flow starts with the flag value being 0, and step S1, step S2 and step S3 are performed.

If the driving power transmitted to the rear wheel 3 increases during driving of the motorcycle 1, a chance that a wheelie will occur increases. During driving, the above explained process flow is repeated and it is sequentially determined whether or not a wheelie has started. If it is determined that the wheelie has started, the engine driving power is suppressed promptly. This makes it possible to suitably prevent the vehicle body from being tilted such that the front wheel 2 lifts off the ground with the rear wheel 3 contacting the ground, and to bring the front wheel 2 into contact with the ground quickly.

Hereinafter, the wheelie starting determination (S2), the driving power suppressing mode (S7) and the wheelie ending determination (S8), will be described in detail.

Figure 6:
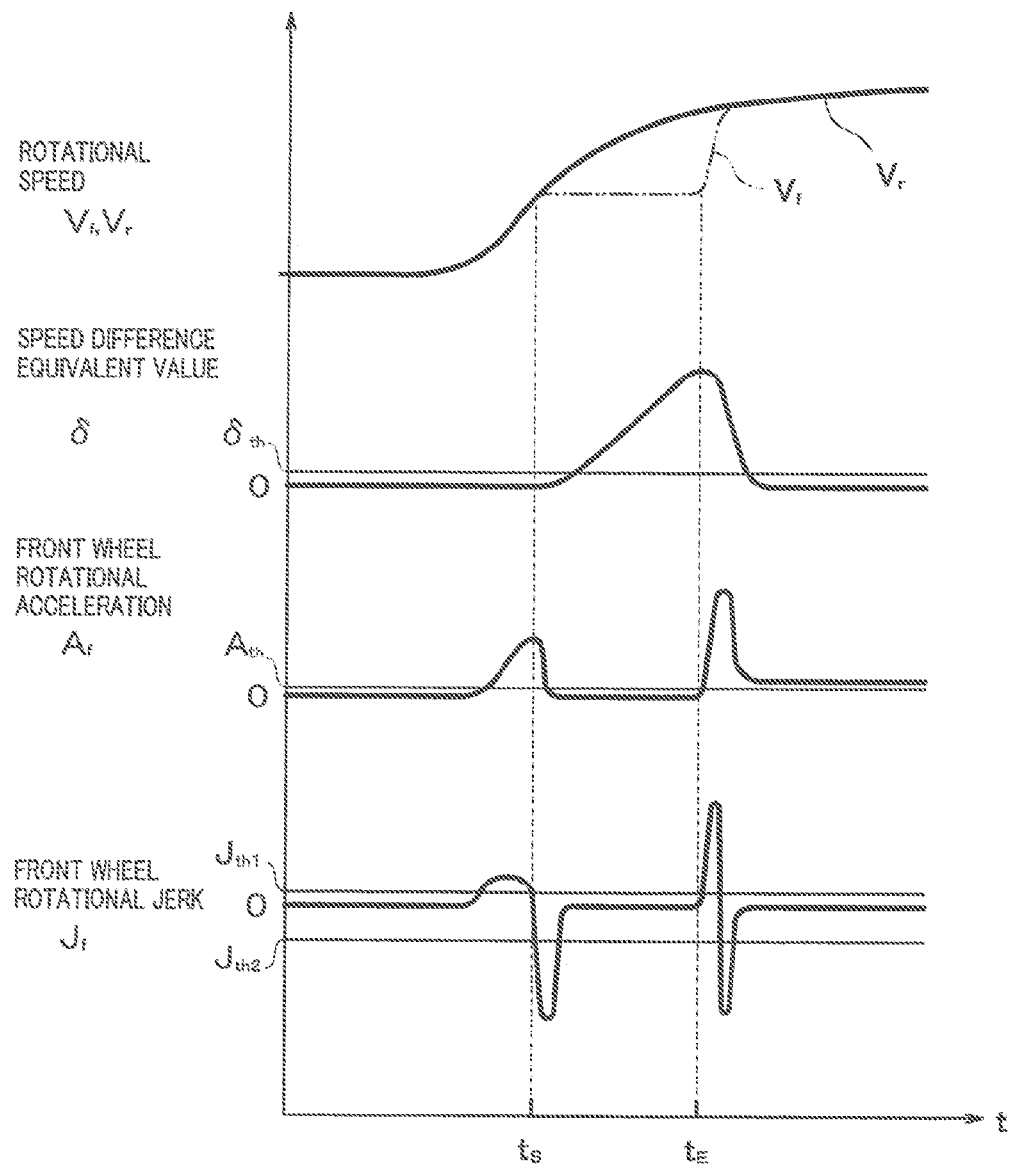
FIG. 6 is a timing chart showing an exemplary time-lapse change in a driving state in a period including a period during which a wheelie is occurring in the motorcycle in FIG. 1.

FIG. 6 is a timing chart showing an exemplary time-lapse change in a driving state in a period including a period when a wheelie is occurring in the motorcycle 1. In FIG. 6, the vertical axis indicates rotational speeds $V_f$ and $V_r$ of the front and rear wheels 2 and 3, the speed difference equivalent value δ between the front and rear wheels 2 and 3, the rotational acceleration $A_f$ of the front wheel 2, and the rotational jerk $J_f$ of the front wheel 2, in this order from the top to the bottom of the vertical axis. In FIG. 6, a horizontal axis indicates a time t, and it is assumed that the wheelie starts at time $t_S$ and ends at time $t_E$. The behavior of the motorcycle 1 in a period including starting of the wheelie will be described with reference to FIG. 6. Here, it is supposed that there is no difference in diameter between the front and rear wheels 2 and 3. In a case where there is a difference in diameter between the front and rear wheels 2 and 3, a compensation value allowing for the diameter difference is set to compensate for this difference.

Before the wheelie starts, the front and rear wheels 2 and 3 are in contact with the ground, and therefore the speed difference equivalent value δ between the front and rear wheels 2 and 3 is approximately 0. Before the wheelie starts, the engine driving power transmitted to the rear wheel 3 is likely to be high, and the rotational speeds $V_f$ and $V_r$ of the front and rear wheels 2 and 3 are both increasing. Therefore, the rotational acceleration $A_f$ of the front wheel 2 and the rotational acceleration of the rear wheel 3 have positive values, respectively (see FIG. 4).

Upon the wheelie starting under this condition, the rotational speed $V_r$ of the rear wheel 3 continues to increase. On the other hand, since the front wheel 2 is lifting off the ground, the front wheel 2 starts rotating at a substantially constant rotational speed $V_f$ due to inertia. To be precise, the rotational speed $V_f$ of the front wheel 2 gradually decreases under influences of an air resistance and an inertia moment of the front wheel 2. For this reason, after the wheelie has started, the speed difference equivalent value δ between the front and rear wheels 2 and 3 increases. The rotational acceleration $A_f$ of the front wheel 2 decreases rapidly from the positive value to a value near 0 in a very short period including the time point $t_S$ at which the wheelie has started, and thereafter is stabilized at a value near 0. In this embodiment, the wheelie starting condition is set based on a change in the speed difference equivalent value δ between the front and rear wheels 2 and 3 and a change in the rotational acceleration $A_f$ of the front wheel 2 in the period including starting of the wheelie.

Figure 7:
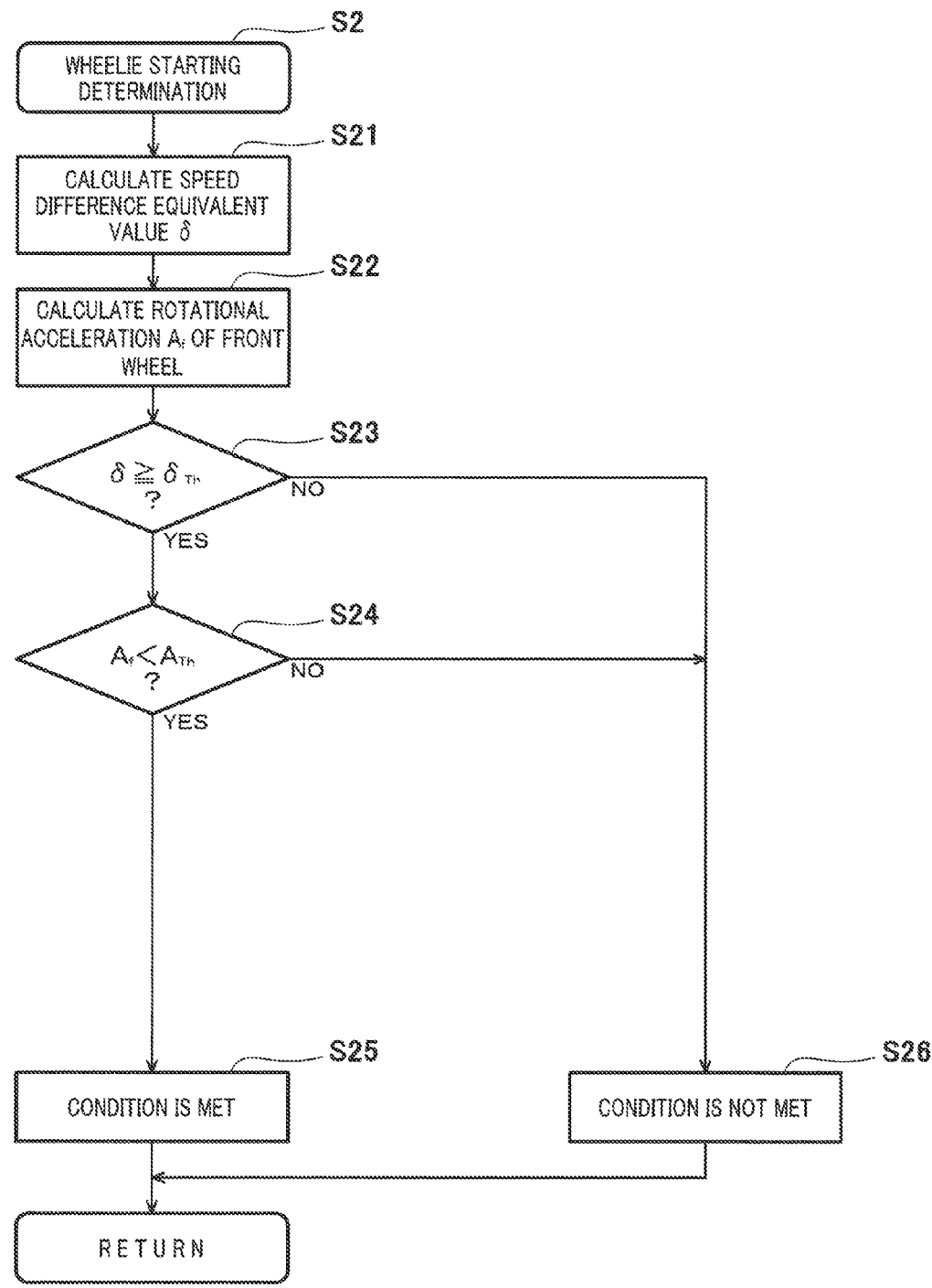
FIG. 7 is a flowchart showing a flow of a process for determining whether or not the wheelie has started in FIG. 5.

FIG. 7 is a flowchart showing a flow of a process for the wheelie starting determination (S2) in FIG. 5. Initially, the speed difference equivalent value calculator 62 calculates the speed difference equivalent value δ between the front and rear wheels 2 and 3 based on the value $V_f$ detected by the front wheel speed sensor 55 and the value $V_r$ detected by the rear wheel speed sensor 56 (S21). Next, the change value calculator 63 calculates the rotational acceleration $A_f$ of the front wheel 2 based on the value $V_f$ detected by the front wheel speed sensor 55 (S22).

Then, the wheelie determiner 64 determines whether or not the calculated speed difference equivalent value δ (e.g., $V_r - V_f$) is not less than a predetermined value $δ_{Th}$ prestored in the memory 66 (S23). If it is determined that speed difference equivalent value δ is less than the predetermined value $δ_{Th}$ (S23: NO), the wheelie determiner 64 determines that the wheelie starting condition is not met (S26), and the process returns to the flow of the main process.

On the other hand, if it is determined that speed difference equivalent value δ is not less than (i.e., greater than or equal to) the predetermined value $δ_{Th}$ (S23: YES), the wheelie determiner 64 determines whether or not the calculated rotational acceleration $A_f$ of the front wheel 2 is less than a predetermined value $A_{Th}$, prestored in the memory 66 (S24). The predetermined value $A_{Th}$ is set to a value near 0, more preferably, a positive value (e.g., 0.5 m/sec²).

If it is determined that the rotational acceleration $A_f$ of the front wheel 2 is less than the predetermined value $A_{Th}$ (S24: YES), the wheelie determiner 64 determines that the wheelie starting condition is met (S25), and the process returns to the main process flow. On the other hand, if it is determined that the rotational acceleration $A_f$ of the front wheel 2 is not less than the predetermined value $A_{Th}$ (S24: NO), the wheelie determiner 64 determines that the wheelie starting condition is not met (S26), and the process returns to the main process flow. In this embodiment, the predetermined value $A_{Th}$ is set to a positive value.

According to the above process flow, the wheelie starting condition includes two conditions, which are a condition that the rotational acceleration $A_f$ of the front wheel 2 is less than the predetermined value $A_{Th}$ and a condition that the speed difference equivalent value δ between the front and rear wheels 2 and 3 is not less than (i.e., greater than or equal to) the predetermined value $δ_{Th}$. The wheelie determiner 64 determines that the wheelie starting condition is met if both of these two conditions are met. As can be seen from FIG. 6, in a period including starting of the wheelie, the speed difference equivalent value δ increases and the rotational acceleration $A_f$ of the front wheel 2 decreases rapidly. Therefore, it can be suitably determined whether or not the wheelie has started based on whether or not the wheelie starting condition, including the above two conditions, is met. Since the predetermined value $A_{Th}$ is set to the positive value near 0, it can be suitably determined that the wheelie has started, at a time point just before the front wheel 2 starts rotating substantially at a constant speed due to inertia, upon the wheelie starting, even though the rotational acceleration $A_f$ of the front wheel 2 changes just before the wheelie starts.

For example, in a case where the rear wheel 3 is slipping on the ground, the speed difference equivalent value δ is not less than (i.e., greater than or equal to) the predetermined value $δ_{Th}$. Also, in a case where the motorcycle 1 is driving at a constant speed or in a decelerated state, the rotational acceleration $A_f$ of the front wheel 2 is less than the predetermined value $A_{Th}$. Since it is determined that the wheelie has started if both of the above two conditions are met, it is possible to distinguish starting of the wheelie from these example driving states.

The rotational acceleration $A_f$ of the front wheel 2 is derived from the value $V_f$ detected by the front wheel speed sensor 55. The speed difference equivalent value δ is derived from the value $V_f$ detected by the front wheel speed sensor 55 and the value $V_r$ detected by the rear wheel speed sensor 56. A signal of the value $V_f$ detected by the front wheel speed sensor 55 and a signal of the value $V_r$ detected by the rear wheel speed sensor 56 are less likely to contain noise generated by vibration of the vehicle body, etc, in contrast to a signal of a value detected by an acceleration sensor, and more accurately indicate an actual driving state of the motorcycle 1. The values δ and $A_f$ derived from the detected values $V_f$ and $V_r$ also more accurately indicate the actual driving state of the motorcycle 1. By using the values δ and $A_f$, it can be suitably determined whether or not the wheelie has started, in response to an actual driving state. Since generally used sensors, such as electromagnetic pick-up sensors, may be used as the front wheel speed sensor 55 and the rear wheel speed sensor 56, a control system capable of accurately determining whether or not the wheelie has started is implemented in an inexpensive manner. Alternatively, it may be determined whether or not the wheelie has started, by using either the speed difference equivalent value δ or the rotational acceleration $A_f$ of the front wheel 2.

Turning back to FIG. 6, in a short period including starting of the wheelie, the rotational acceleration $A_f$ of the front wheel 2 changes from increasing to decreasing, and thereafter is stabilized at a value near 0. At this time, the rotational jerk $J_f$ of the front wheel 2 rapidly decreases to a negative value and rapidly increases up to a value near 0 during the period when the rotational acceleration $A_f$ of the front wheel 2 rapidly decreases to a value near 0 and starts to be stabilized at a value near 0. Thereby, the rotational jerk $J_f$ of the front wheel 2 steeply decreases and steeply increases in a short period including starting of the wheelie.

In view of the above, the wheelie starting condition may be set based on a change in the rotational jerk $J_f$ of the front wheel 2. To be specific, the wheelie starting condition may include a condition that the rotational jerk $J_f$ of the front wheel 2 is less than a predetermined value $J_{Th1}$. In this case, the predetermined value $J_{Th1}$ may be set to a positive value near 0. Alternatively, it may be determined whether or not the wheelie has started using a negative value $J_{Th2}$ near 0, instead of the predetermined value $J_{Th1}$. For example, in a case where a clutch is not operated well, the rotational jerk $J_f$ of the front wheel 2 may rapidly change. For this reason, in a case where the condition of the rotational jerk $J_f$ of the front wheel 2 is set to be included in the wheelie starting condition, it may be determined that the wheelie has started if it is determined that the condition of the rotational jerk $J_f$ of the front wheel 2 and the condition of the speed difference equivalent value $\delta$ are both met. This makes it possible to distinguish starting of the wheelie from another driving states. The rotational jerk $J_f$ of the front wheel 2 is a value derived from the value $V_f$ detected by the front wheel speed sensor 55, like the rotational acceleration $A_f$ of the front wheel 2, and more accurately indicates an actual driving state of the motorcycle 1. Therefore, it can be more accurately determined whether or not the wheelie has started, in response to the actual driving state, by using the rotational jerk $J_f$ of the front wheel 2.

Upon the wheelie starting, the rotational acceleration $A_f$ of the front wheel 2 rapidly decreases, but there is no significant change in a trend of the rotational speed $V_r$ of the rear wheel 3 and the rotational acceleration of the rear wheel 3 maintains a positive value in a period including starting of the wheelie, within a period until suppressing of the engine driving power in the driving power suppressing mode starts, as described later. Therefore, upon the wheelie starting, an acceleration difference between the front and rear wheels 2 and 3, as well as the speed difference equivalent value $\delta$, increases. Based on this, the wheelie starting condition may include a condition that the acceleration difference between the front and rear wheels 2 and 3 is not less than a predetermined value. In this case, the rotational acceleration of the rear wheel 3 may be calculated by differentiating the value $V_r$ detected by the rear wheel speed sensor 56 by time, one time, as in the case of the rotational acceleration $A_f$ of the front wheel 2.

Before the wheelie starts, the front wheel 2 is in contact with the ground, and the front suspension 8 is contracted by a reactive force applied from the ground, with respect to a weight of the vehicle body. In this case, a stroke L of the front suspension 8 is shorter than a maximum stroke. On the other hand, after the wheelie has started, the front wheel 2 lifts off the ground and no load is applied to the front suspension 8. In this case, the stroke L of the front suspension 8 is equal to the maximum stroke. Therefore, the wheelie starting condition may include a condition that a value L detected by the stroke sensor 57 is not less than a predetermined value. It should be noted that the stroke L is variable due to bumps and depressions on the road surface during off-road driving of the motorcycle 1. For this reason, in a case where the condition of the stroke L of the front suspension 8 is set to be included in the wheelie starting condition, it may be determined that the wheelie has started if the condition of the stroke L of the front suspension 8 and the condition of the speed difference equivalent value $\delta$ between the front and rear wheels 2 and 3 are both met. This makes it possible to accurately distinguish starting of the wheelie from off-road driving.

Although several conditions are descried as being included in the wheelie starting condition, it is sufficient that at least one of them is included in the wheelie starting condition. In a case where two or more of the above conditions are included in the wheelie starting condition, it may be determined that that the wheelie has started if at least one of these two conditions is met.

Figure 8:
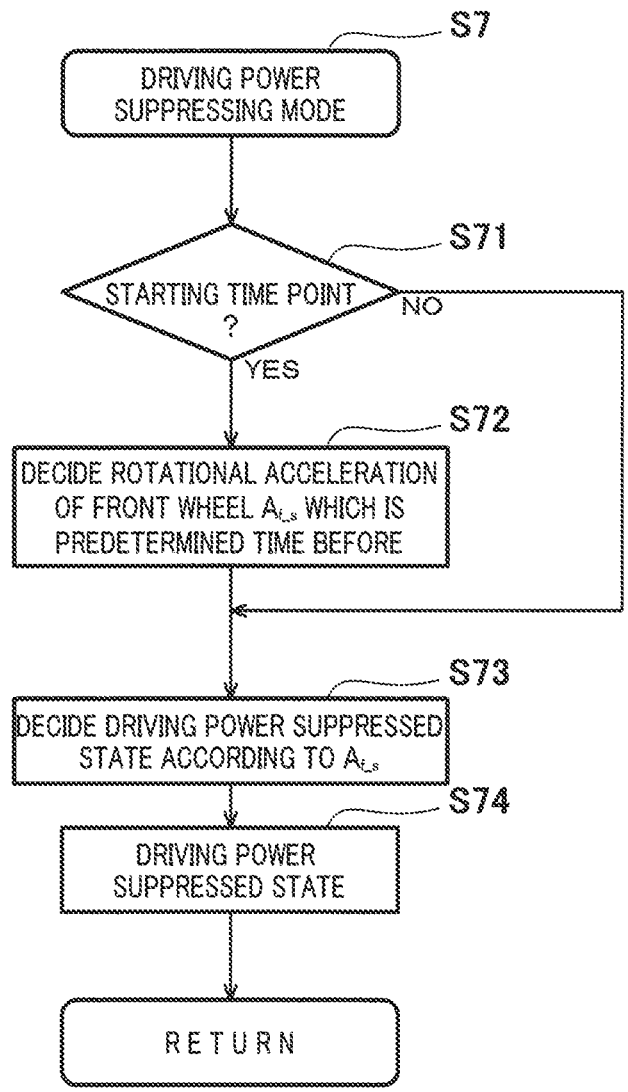
FIG. 8 is a flowchart showing a flow of a process in a driving power suppressing mode in FIG. 5.

FIG. 8 is a flowchart showing a flow of the process in the driving power suppressing mode (S7) in FIG. 5. Referring to FIG. 8, initially, the driving power controller 65 determines whether or not the present time is a time point when the wheelie has started (starting point) (S71). In other words, the driving power controller 65 determines whether it was determined that the wheelie starting condition was met in the present process flow or in a previous process flow. In this case, if it is determined that the wheelie starting condition was met in the present process flow, the driving power controller 65 determines that the present time is a time point when the wheelie has started.

If it is determined that the present time is the time point when the wheelie has started (S71: YES), a rotational acceleration $A_{f\_s}$ of the front wheel 2 at the time point when the wheelie has started, or at a time point near that time point, is derived (S72). This rotational acceleration $A_{f\_s}$ is referred to as "starting acceleration" for the sake of convenience of explanation. As described above, upon the wheelie starting, the rotational acceleration $A_f$ of the front wheel 2 changes from increasing to decreasing. The starting acceleration $A_{f\_s}$ is a rotational acceleration at a time point near a time point when the rotational acceleration $A_f$ of the front wheel 2 has changed to decreasing. In step S72, a rotational acceleration $A_f$ calculated at a time point which is a predetermined short time before a time point when the present process is executed, may be derived as the starting acceleration $A_{f\_s}$. Alternatively, a rotational acceleration $A_f$ calculated at a time point when the rotational jerk $J_r$ becomes 0 or at a time point just before the time point when the rotational jerk $J_r$ becomes 0, may be derived as the starting acceleration $A_{f\_s}$. The starting acceleration $A_{f\_s}$ is a value indicating a degree to which a driving power is high, which is one cause for starting the wheelie. It can be found out that as the starting acceleration $A_{f\_s}$ is higher, the driving power generated in the engine 12 at a time point when the wheelie has started is higher.

Then, the driving power controller 65 decides a suppressed state according to the starting acceleration $A_{f\_s}$ (S73). The term "suppressed state" is meant to include a suppressed amount of the engine driving power to be generated in the normal mode, a time point when the driving power suppressing control actually starts, a time point when the driving power suppressing control terminates, and a suppressed trend (change in a suppressed amount which occurs with a lapse of time).

In this embodiment, the time point when the driving power suppressing control starts is the time point when it is determined that the wheelie starting condition is met and the normal mode transitions to the driving power suppressing mode. Since the engine driving power can be suppressed as quickly as possible in the driving power suppressing mode, the wheelie can be ended quickly. As shown in FIG. 5, a time point when the driving power suppressing control terminates is a time point when a wheelie ending condition is met (see FIG. 5). As shown in FIG. 8, it is assumed that there is no change in the suppressed amount which occurs with a lapse of time.

Figure 9:
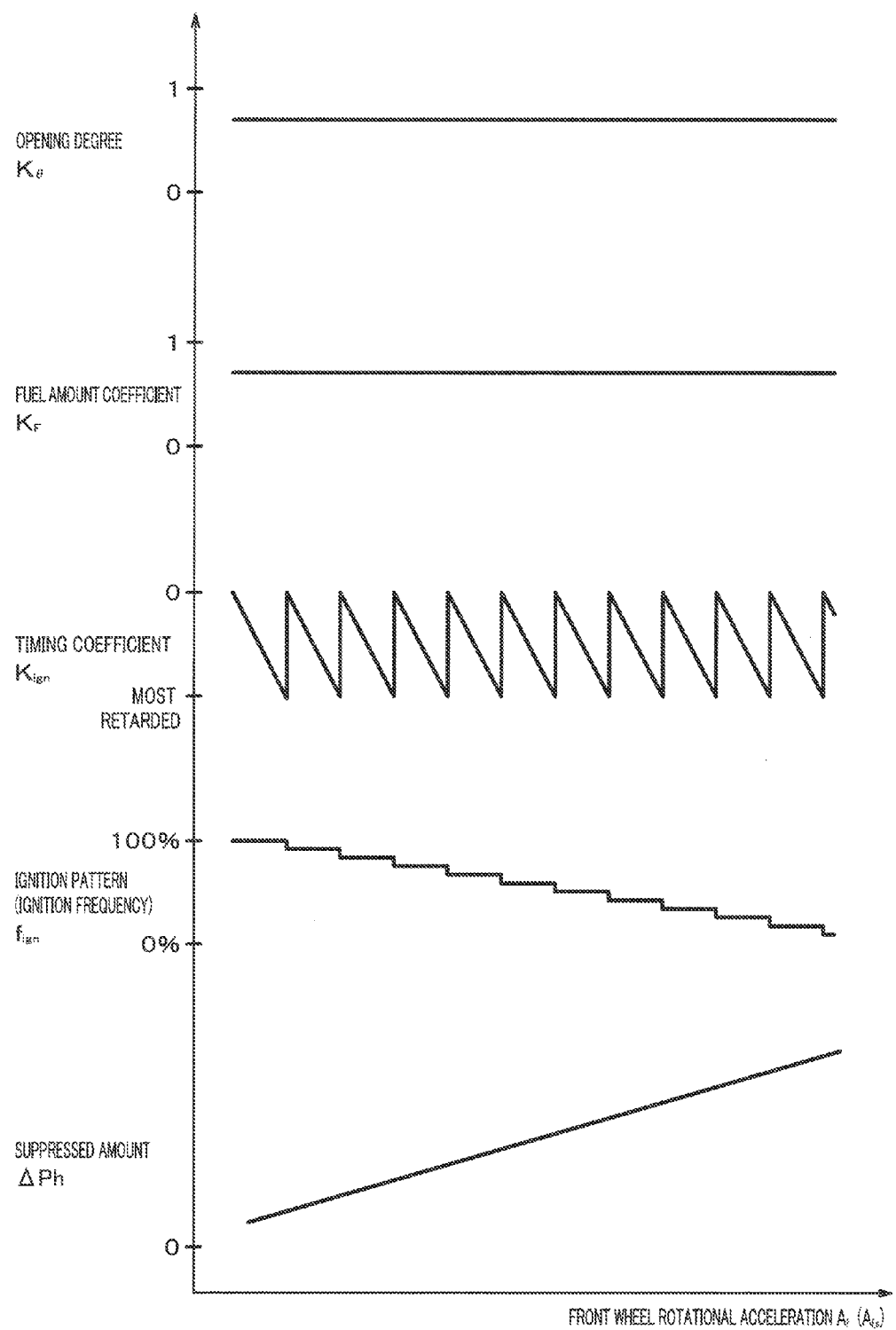
FIG. 9 is a graph showing a process for deciding a driving power suppressed state in FIG. 8.

FIG. 9 is a graph showing a relationship between a suppressed amount ΔPh and the starting acceleration $A_{f\_s}$. Referring to FIG. 9, the driving power controller 65 decides the suppressed amount ΔPh such that the suppressed amount ΔPh increases as the starting acceleration $A_{f\_s}$ increases. In this way, a degree to which the engine driving power is suppressed increases when the engine driving power at the starting of the wheelie is higher. This effectively prevents a situation where the front part of the vehicle lifts off the ground, and significantly tilts upwards relative to the ground, which could otherwise occur because of occurrence of the wheelie, and ends the wheelie promptly.

The suppressed amount ΔPh may be regarded as a compensation amount in a case where a target opening degree, a target fuel amount, a target ignition timing and/or an ignition frequency, which are to be decided in the normal mode, are compensated based on the starting acceleration $A_{f\_s}$. By controlling the valve actuator 25, and each fuel feeder 26 and igniter 27, based on the compensation amount, the engine driving power generated in the normal mode can be suppressed by the suppressed amount ΔPh, corresponding to the starting acceleration $A_{f\_s}$.

For example, the target opening degree in the driving power suppressing mode is calculated like the target opening degree in the normal mode and is compensated to be decreased by multiplying the calculated target opening degree by an opening degree coefficient $K_\theta$, which is less than 1. The target fuel amount is compensated to be decreased by multiplying the target fuel amount by a fuel amount coefficient $K_F$, which is also less than 1. The target ignition timing is compensated to be retarded by multiplying the target ignition timing by a timing coefficient $K_{ign}$.

The coefficients $K_\theta$, $K_F$, and $K_{ign}$ and the ignition frequency $f_{ign}$ for deciding the compensation amounts may be set to decrease as the starting acceleration $A_{f\_s}$ increases. In a case where the throttle device 13, the fuel feeders 26, and the igniters 27 are controlled collectively, as in this embodiment, the suppressed amount ΔPh may consequently be made different, according to the starting acceleration $A_{f\_s}$. Therefore, one of the compensation amounts may be constant regardless of a change in the starting acceleration $A_{f\_s}$ (see $K_\theta$, $K_F$, in FIG. 9), may increase and decrease repetitively with an increase in the starting acceleration $A_{f\_s}$ (see $K_{ign}$ in FIG. 9), or otherwise may decrease stepwisely with an increase in the starting acceleration $A_{f\_s}$ (see $f_{ign}$ in FIG. 9).

Turning back to FIG. 8, the driving power controller 65 controls the throttle device 13, and each fuel feeder 26 and igniter 27, based on the suppressed amounts ΔPh, decided as described above (the coefficients $K_\theta$, $K_F$, and $K_{ign}$ and ignition frequency $f_{ign}$) (S74), thereby suppressing the driving power.

When the step S74 is performed, the process returns to the main process flow and the present process flow ends. If it is determined that the wheelie ending condition is not met in a next process flow, the driving power control in the driving power suppressing mode (S7) continues and the process moves to step S71. In this case, since it was determined that the wheelie starting condition was met in a process flow before the previous process flow, it is determined that the present time is not a time point when the wheelie has started (S71: NO). The driving power controller 65 skips step S72 and decides a driving power suppressed state according to the starting acceleration $A_{f\_s}$ (S73). The driving power controller 65 controls the throttle device 13, and each fuel feeder 26 and igniter 27, based on the decided driving power suppressed state (S74).

Figure 10:
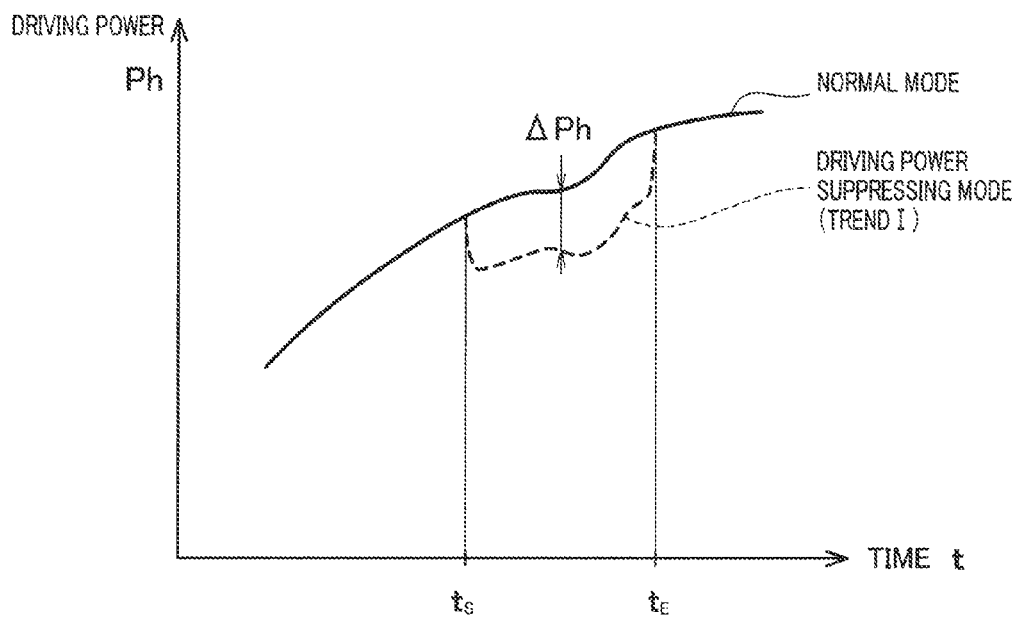
FIG. 10 is a graph showing an exemplary time-lapse change in an engine driving power in a case where the process flow in FIG. 8 is executed.

FIG. 10 is a timing chart showing an exemplary time-lapse change in the engine driving power in a period including a period when the wheelie is occurring. With reference to a dotted line in FIG. 10, in this embodiment, during a period when the control in the driving power suppressing mode continues, the suppressed amount ΔPh, decided according to the starting acceleration $A_{f\_s}$, is maintained. Upon the wheelie starting, the rotational acceleration $A_f$ of the front wheel 2 is stabilized at a value near 0. Therefore, in a case where the suppressed amount ΔPh is decided sequentially according to the rotational acceleration $A_f$ of the front wheel 2, which is calculated sequentially during the continuation of the control in the driving power suppressing mode, the suppressed amount ΔPh is promptly stabilized at a small value, regardless of a magnitude of the driving power generated in the engine 12 just before the wheelie starts. In this embodiment, since the suppressed amount ΔPh, decided according to the starting acceleration $A_{f\_s}$, is maintained, the driving power Ph can continue to be suppressed according to a magnitude of the driving power Ph generated in the engine 12 just before the wheelie starts, regardless of a state of the rotational acceleration $A_f$ of the front wheel 2 during the period when the wheelie is occurring. As a result, even when the driving power generated in the engine 12 is high just before the start of the wheelie, the suppressed amount ΔPh does not decrease during the period when the wheelie is occurring. This makes it possible to end the wheelie quickly.

Figure 11:
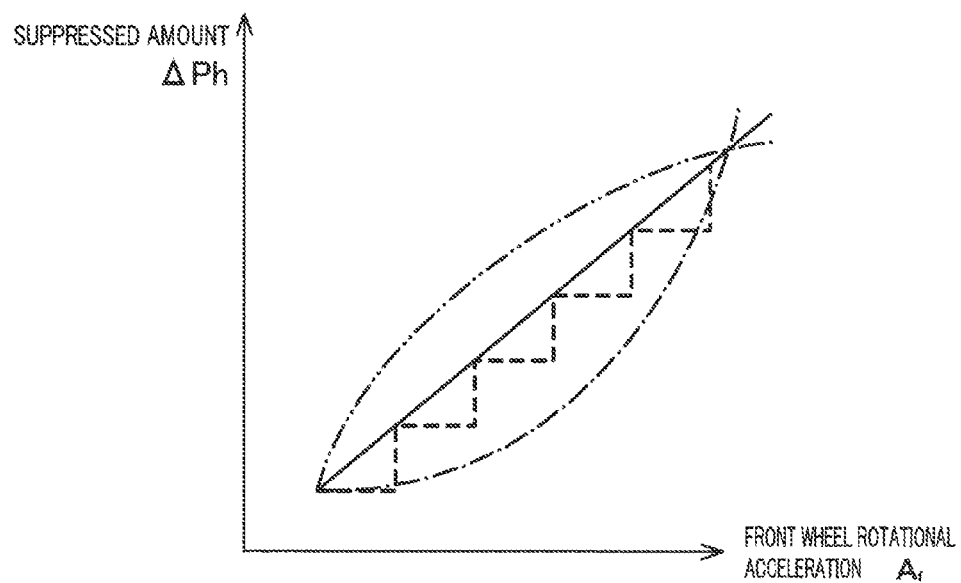
FIG. 11 is a graph showing an alternative example of a suppressed amount of the engine driving power in a case where the engine driving power is controlled in the driving power suppressing mode.

FIG. 11 is a graph showing an alternative example of a relationship between the suppressed amount ΔPh and the starting acceleration $A_{f\_s}$. Referring to FIG. 11, the suppressed amount ΔPh may change linearly with respect to the starting acceleration $A_{f\_s}$ (see solid line) or non-linearly with respect to the starting acceleration $A_{f\_s}$. If the suppressed amount ΔPh changes non-linearly with respect to the starting acceleration $A_{f\_s}$, it may increase stepwisely (see dashed line) according to an increase in the starting acceleration $A_{f\_s}$, may increase with an increasing increase rate (see one-dotted dashed line) according to an increase in the starting acceleration $A_{f\_s}$, or may increase with a decreasing increase rate (see two-dotted dashed line) according to an increase in the starting acceleration $A_{f\_s}$.

Figure 12:
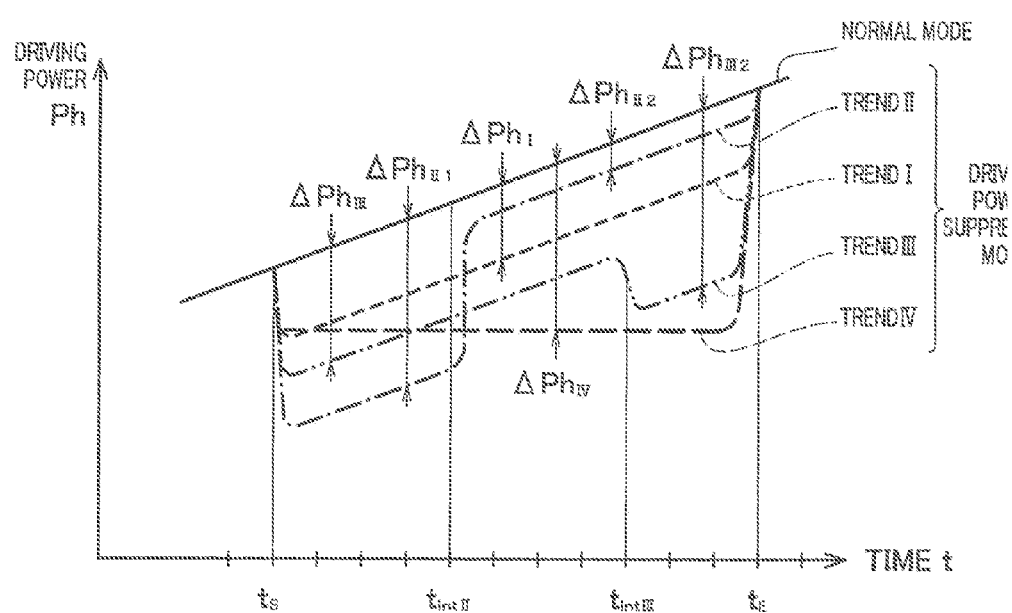
FIG. 12 is a graph showing an alternative example of a suppressed amount which fluctuates with a lapse of time in a case where the engine driving power is controlled in the driving power suppressing mode.

FIG. 12 is a graph showing an alternative example of the suppressed amount ΔPh which fluctuates with a lapse of time. In FIG. 12, a shorter-dashed line indicates a trend (trend I) of the driving power Ph generated in the engine 12 in a case where the engine driving power is suppressed according to the process flow in FIG. 8. With reference to the trend I, a suppressed amount $\Delta Ph_1$ is constant from start of the driving power suppressing control until the end of the control, as described above.

As indicated by a one-dotted dashed line in FIG. 12, a trend (trend II) may be used, in which a suppressed amount $\Delta Ph_{II1}$ from the time point when the driving power suppressing control starts until a time point $t_{intII}$, after a lapse of a predetermined time is smaller than a suppressed amount $\Delta Ph_{II2}$ after the time point $t_{intII}$. In the trend II, the suppressed amount $\Delta Ph_{II1}$ at the time point when the driving power suppressing control starts is relatively larger. By setting the larger suppressed amount $\Delta Ph_{II1}$ at the time point when the driving power suppressing control starts, a situation in which the front part of the vehicle body tilts upwards off the ground can be effectively inhibited just after the wheelie has started.

On the other hand, as indicated by a two-dotted dashed line in FIG. 12, a trend (trend III) may be used, in which a suppressed amount $\Delta Ph_{III1}$ from a time point when the driving power suppressing control starts until a time point $t_{intIII}$, after a lapse of a predetermined time is larger than a suppressed amount $\Delta Ph_{III2}$ after the time point $t_{inIII}$. In the trend III, since the suppressed amount $\Delta Ph_{III2}$ increases with a lapse of time, it is possible to end the wheelie quickly even when the wheelie seems to last for a long time.

In the trends II and III, the suppressed amount changes stepwisely. Alternatively, as indicated by a longer-dashed line in FIG. 12, a trend (trend IV) may be used, in which a suppressed amount $\Delta Ph_{IV}$ changes sequentially. In the trend IV, the suppressed amount $\Delta Ph_{IV}$ may increase with a lapse of time, as shown in FIG. 12, or otherwise decrease with a lapse of time. This reduces a chance that an impact due to a fluctuation in the engine driving power will be transmitted to the vehicle body during occurrence of the wheelie.

Turning back to FIG. 6, the behavior of the motorcycle 1 in a period including a time point when the wheelie ends will be described. When the wheelie is occurring, the speed difference equivalent value δ between the front and rear wheels 2 and 3 is great, and the rotational acceleration $A_f$ of the front wheel 2 is stabilized at a value near 0.

Under this condition, when the wheelie ends and the front wheel 2 contacts the ground, the rotational speed $V_f$ of the front wheel 2 promptly changes so as to compensate for the speed difference equivalent value δ with respect to the rotational speed $V_r$ of the rear wheel 3, and thereafter gets close to the rotational speed $V_r$ of the rear wheel 3. Therefore, the rotational acceleration $A_f$ of the front wheel 2 changes from the value near 0 to a value substantially equal to the rotational acceleration of the rear wheel 3.

When the wheelie is occurring, the engine driving power is suppressed in the driving power suppressing mode, and therefore, the speed difference equivalent value δ between the front and rear wheels 2 and 3 will not increase although it does not fully reach 0 at the time point when the wheelie ends. Therefore, in some cases, a change in the rotational speed $V_f$ of the front wheel 2 is suppressed, and a rapid change in the rotational speed $V_f$ of the front wheel 2 will not occur after the wheelie ends. However, the rotational jerk $J_f$ of the front wheel 2 changes sensitively in response to a change in the rotational acceleration $A_f$ of the front wheel 2. A change in the rotational jerk $J_f$ of the front wheel 2 appears for a very short period until the rotational speed $V_f$ of the front wheel 2 has compensated for the speed difference equivalent value δ with the rotational speed $V_r$ of the rear wheel 3. In this embodiment, the wheelie ending condition is set based on the rotational jerk $J_f$ of the front wheel 2 in a period including ending of the wheelie.

Figure 13:
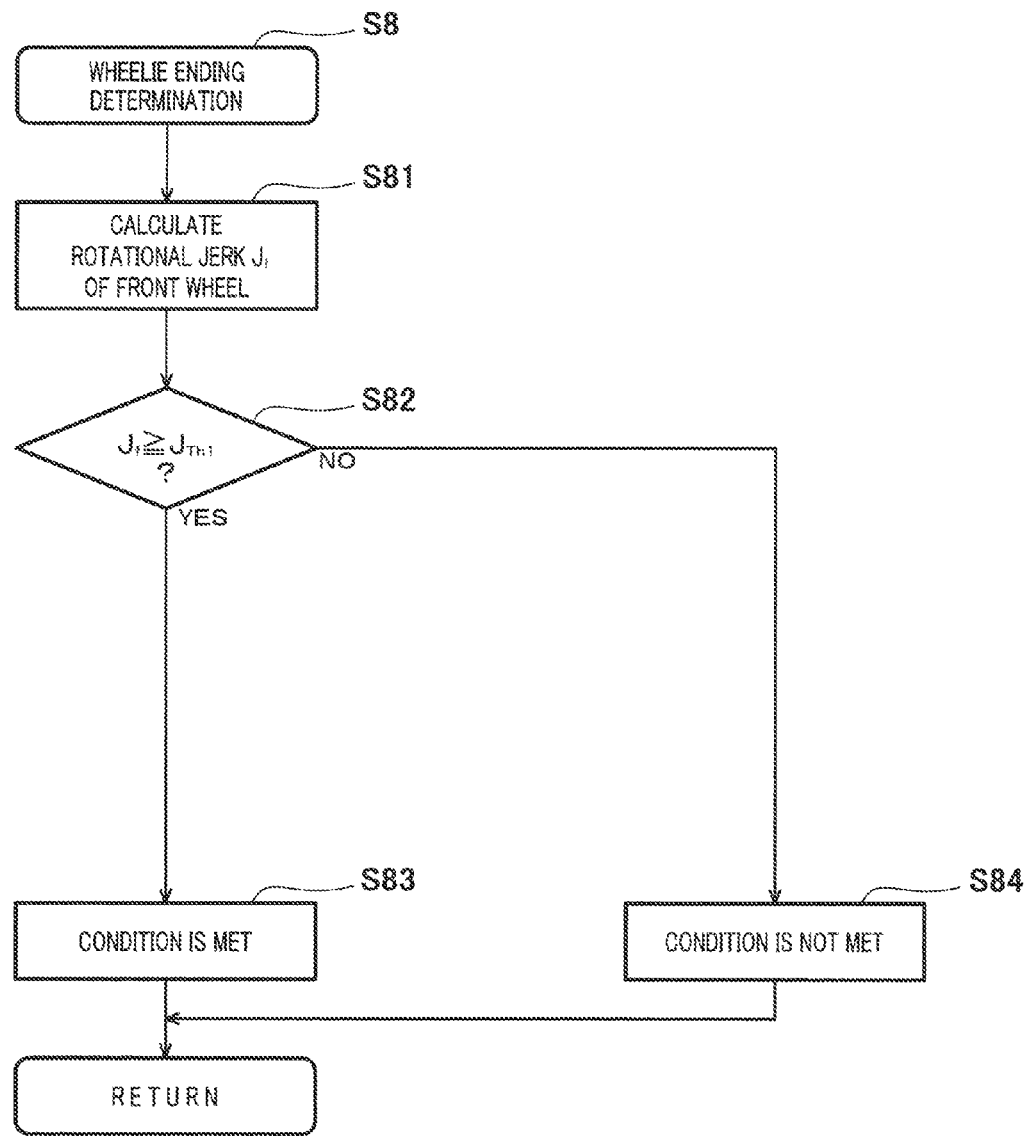
FIG. 13 is a flowchart showing a flow of a process for determining whether or not the wheelie has ended in FIG. 5.

FIG. 13 is a flowchart showing a process flow in the wheelie ending determination (S8) in FIG. 5. Initially, the change value calculator 63 calculates the rotational jerk $J_f$ of the front wheel 2 based on the value $V_r$ detected by the front wheel speed sensor 55 (S81). Then, the wheelie determiner 64 determines whether or not the calculated rotational jerk $J_f$ of the front wheel 2 is not less than (i.e., is greater than or equal to) a predetermined value $J_{Th1}$ prestored in the memory 66 (S82). The predetermined value $J_{Th1}$ may be a value near 0 and is preferably a positive value near 0.

If it is determined that the rotational jerk $J_f$ of the front wheel 2 is not less than (i.e., is greater than or equal to) the predetermined value $J_{Th1}$ (S82:YES), the wheelie determiner 64 determines that the wheelie ending condition is met (S83), and the process returns to the main process flow. On the other hand, if it is determined that the rotational jerk $J_f$ of the front wheel 2 is less than the predetermined value $J_{Th1}$ (S82:NO), the wheelie determiner 64 determines that the wheelie ending condition is not met (S84), and the process returns to the main process flow.

According to this process flow, the wheelie ending condition includes a condition that the rotational jerk $J_f$ of the front wheel 2 is not less than (i.e., greater than or equal to) the predetermined value $J_{Th1}$. If this condition is met, the wheelie determiner 64 determines that the wheelie ending condition is met. There is a high chance that the rotational speed $V_r$ of the rear wheel 3 is higher than the rotational speed $V_f$ of the front wheel 2 at the time point when the wheelie ends, although an increase in the rotational speed $V_r$ of the rear wheel 3 is suppressed during the period when the wheelie is occurring. Therefore, it is possible to suitably determine whether or not the wheelie has ended based on whether or not the wheelie ending condition, including this condition, is met. In addition, since the rotational jerk $J_f$ of the front wheel 2 is calculated based on the value $V_f$ detected by the front wheel speed sensor 55, it can be determined more correctly whether or not the wheelie has ended, in response to an actual driving state, as in the case where it is determined whether or not the wheelie has started.

The wheelie ending condition may include two conditions, i.e., a condition that the rotational jerk $J_f$ of the front wheel 2 is not less than (i.e., is greater than or equal to) the predetermined value $J_{Th1}$, which is a positive value near 0, and a condition that the rotational jerk $J_f$ of the front wheel 2 is less than the predetermined value $J_{Th2}$, which is a negative value near 0. It may be determined that the wheelie ending condition is met if either one of these conditions is met. In other words, it may be determined that the wheelie ending condition is met if the rotational jerk $J_f$ of the front wheel 2 falls outside a range (see FIG. 6) between the predetermined value $J_{Th1}$, which is the positive value near 0, and the predetermined value $J_{Th2}$, which is the negative value near 0. As a result, it can be suitably determined whether or not the wheelie has ended even in a case where the driver performs an engine braking operation during a period when the wheelie is occurring, or even in a case where the engine driving power is suppressed effectively in the driving power suppressing mode, and thereby the rotational speed $V_r$ of the rear wheel 3 is less than the rotational speed $V_f$ of the front wheel 2 rotating at a substantially constant speed at the time point when the wheelie has ended.

(Embodiment 2)

Figure 14:
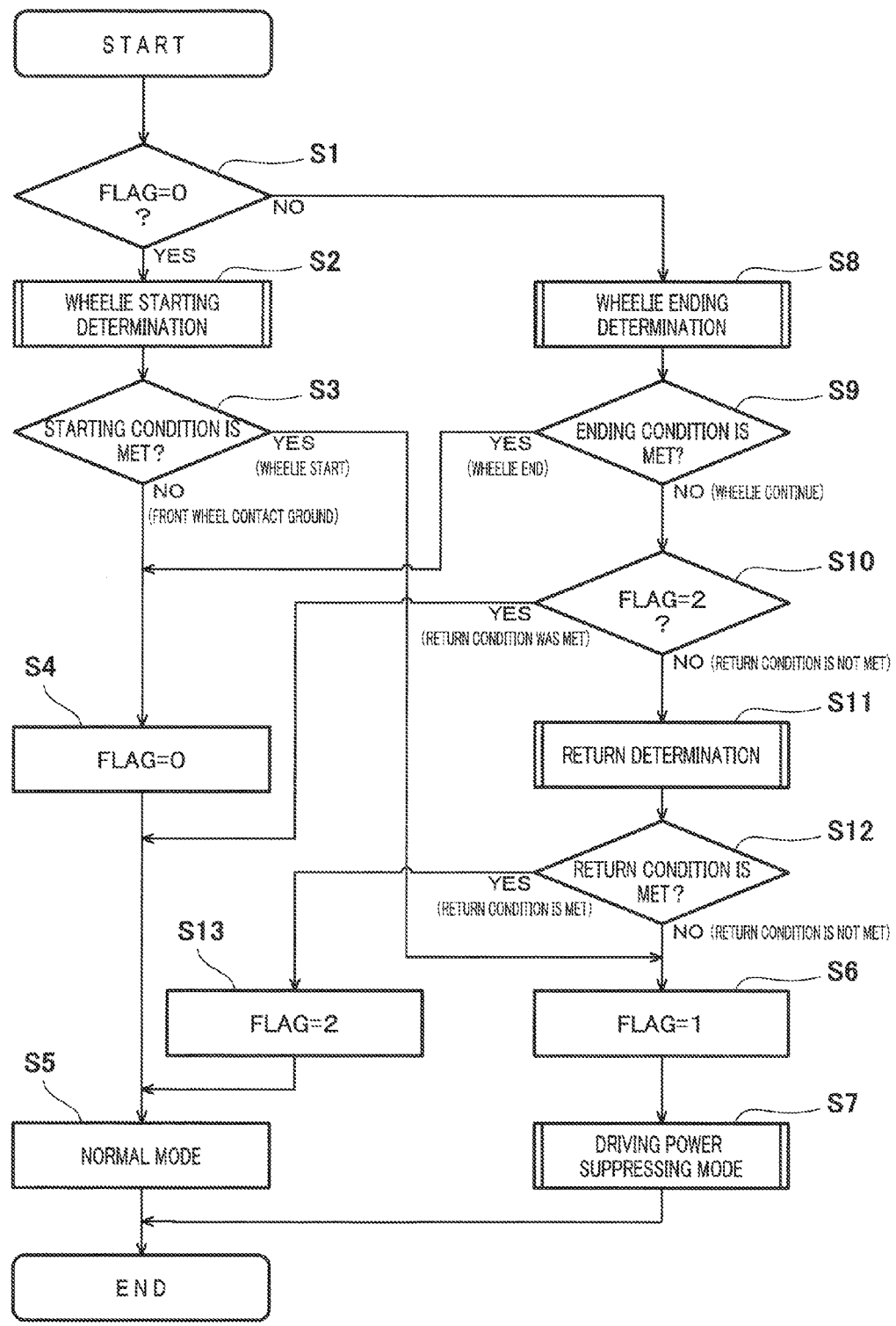
FIG. 14 is a flowchart showing a flow of a main control process executed by an electronic control unit according to Embodiment 2 of the present invention.

FIG. 14 is a flowchart showing a flow of a main control process executed by an electronic control unit in a control system according to Embodiment 2 of the present invention. The process flow in FIG. 14 is different from the process flow shown in FIG. 5 in that steps S10-S12 are inserted between step S9 and step S6 in the flow of FIG. 5, and a flag value is added (see S10, S13) in the flow of FIG. 5. A case where the process moves from step S1 to step S3 (S1: YES) is the same as that shown in FIG. 5 and is described above. In addition, the steps S2, S5, S7 and S8 are identical to those in Embodiment 1 as described above, except for where otherwise noted. Furthermore, the constituents shown in FIGS. 1 to 3 are used in Embodiment 2 and are designated by the same reference symbols.

Referring to FIG. 14, if it is determined that the flag value is not 0 (in other words 1 or 2) in step S1 (S1: NO), the wheelie determiner 64 executes the wheelie ending determination (S8). If it is determined that the wheelie ending condition is met (S9: YES), the flag value becomes 0 (S4), the driving power controller 65 returns to the normal mode (S5), and the present process flow ends. When it is determined that the wheelie ending condition is met and the process ends, a next process flow starts with the flag value being 0, and steps S1, S2, and S3 are performed. On the other hand, if it is determined that the wheelie ending condition is not met (S9: NO), it is determined whether or not the flag value is 2 (S10).

If it is determined that the flag value is not 2 (i.e., 1) (S10: NO), the wheelie determiner 64 determines whether or not a predetermined return condition is met (hereinafter also referred to as return determination) (S12). If it is determined that the return condition is not met (S12: NO), the flag value is maintained at 1 (S6), the driving power controller 65 continues to control the engine driving power in the driving power suppressing mode (S7) and the present process flow ends. When it is determined that the wheelie ending condition is not met, the return condition is not met, and the process flow ends, a next process flow starts with the flag value being 1. Steps S1, S8, and S9 are performed. If it is determined that the wheelie ending condition is not met in the present process flow (S9: NO), steps S10, S11, and S12 are performed.

If it is determined that the return condition is met (S12: YES), the flag value becomes 2 (S13), the driving power controller 65 returns to the normal mode (S5), and the present process flow ends. When it is determined that the wheelie ending condition is not met, the return condition is met, and the process flow ends, a next process flow starts with the flag value being 2, and Step S1, step S8, and step S9 are performed.

If it is determined that the wheelie ending condition is not met (S9: NO) in the present process flow, it is determined as YES in step S10 (S10: YES), and the driving power controller 65 continues to control the driving power in the normal mode (S5). When the process flow ends in this way, a next process flow starts with the flag value being 2, and steps S1, S8, and S9 are performed.

Figure 15:
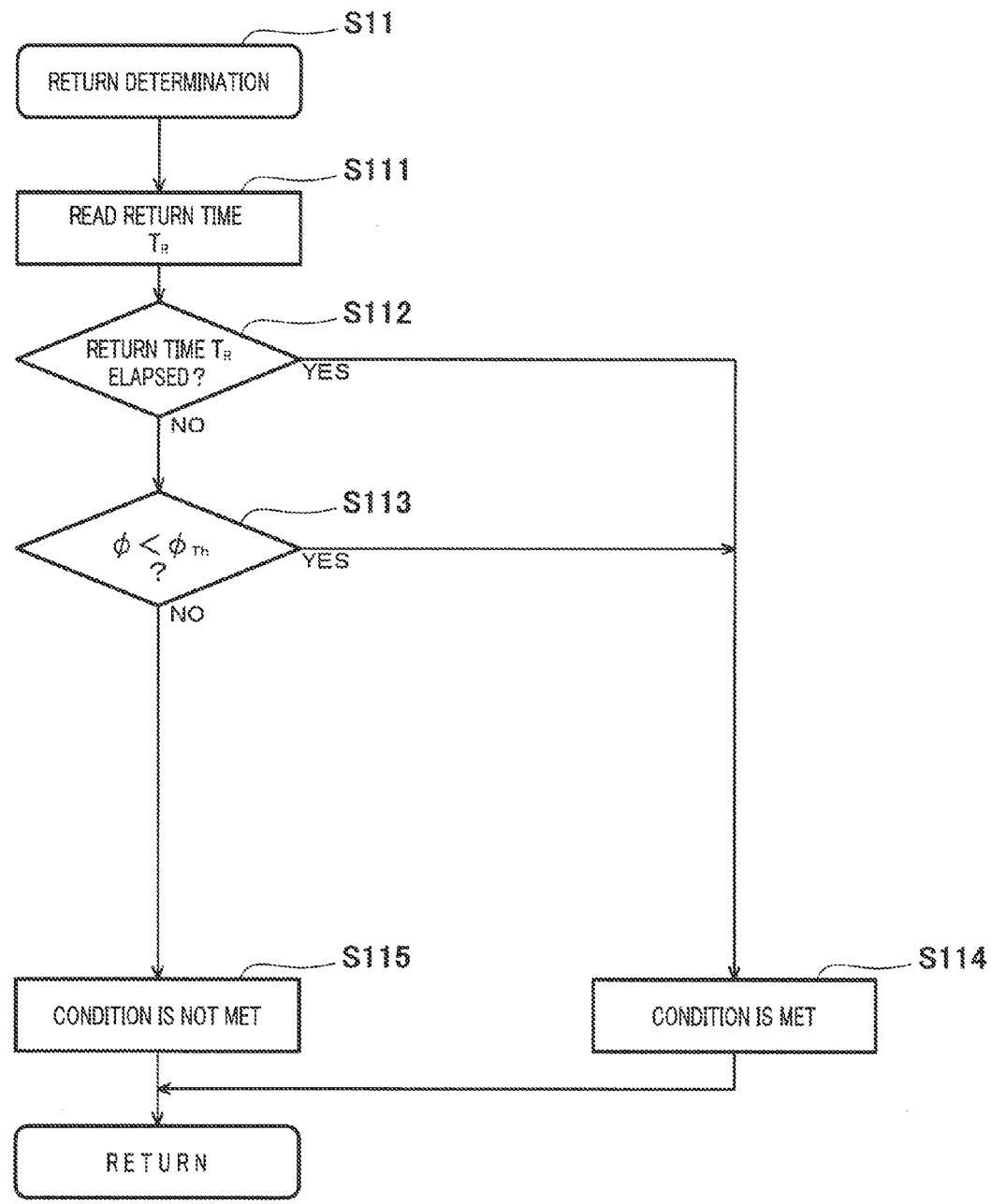
FIG. 15 is a flowchart showing a flow of a process for determining whether or not the motorcycle has returned to a normal mode.

FIG. 15 is a flowchart showing a flow of the process of the return determination in FIG. 14. Initially, the wheelie determiner 64 reads a return time $T_R$ (S111). The return time $T_R$ may be a constant value prestored in the memory 66, or may be a value decided according to the rotational acceleration $A_f$ of the front wheel 2 in the process (S73) for deciding the suppressed state shown in FIG. 8. In the latter case, the return time $T_R$ may be set longer if the rotational acceleration $A_f$ is higher.

Then, the wheelie determiner 64 determines whether or not the read return time $T_R$ has lapsed (step S112). If it is determined that the read return time $T_R$ has lapsed (step S112: YES), the wheelie determiner 64 determines that the return condition is met (S114), and the process returns to the main process flow. On the other hand, if it is determined that the read return time $T_R$ has not lapsed (step S112: NO), the wheelie determiner 64 determines whether or not a grip position $\phi$ is less than a predetermined value $\phi_{Th}$ (S113). The predetermined value $\phi_{Th}$ is set to a value near a value corresponding to a fully closed position of the main throttle valve 23. If it is determined that the grip position $\phi$ is less than the predetermined value $\phi_{Th}$ (S113: YES), the wheelie determiner 64 determines that the return condition is met (S114), and the process returns to the main process flow. If it is determined that the grip position $\phi$ is not less than the predetermined value $\phi_{Th}$ (S113: NO), the wheelie determiner 64 determines that the return condition is not met (S114), and the process returns to the main process flow.

As should be appreciated from the above description, the return condition may include a condition that the return time $T_R$ has lapsed from the time point when the wheelie has started, and a condition that the grip position $\phi$ is less than the predetermined value $\phi_{Th}$, near the value corresponding to the fully closed position. If the grip position $\phi$ is less than the predetermined value $\phi_{Th}$, near the value corresponding to the fully closed position, the opening degree of the main throttle valve 23 becomes a small value, which is near a value corresponding to the fully closed position, in response to a request for reducing the engine driving power made by the user. Since the opening degree of the main throttle valve 23 significantly affects increasing and decreasing of the engine driving power, the engine driving power itself is very small in a state where the opening degree is a small value, near the value corresponding to the fully closed position. In this case, the driving power suppressing mode for suppressing the engine driving power terminates and transitions to the normal mode. Therefore, the vehicle body can be steered favorably under a state where the wheelie is occurring.

Figure 16:
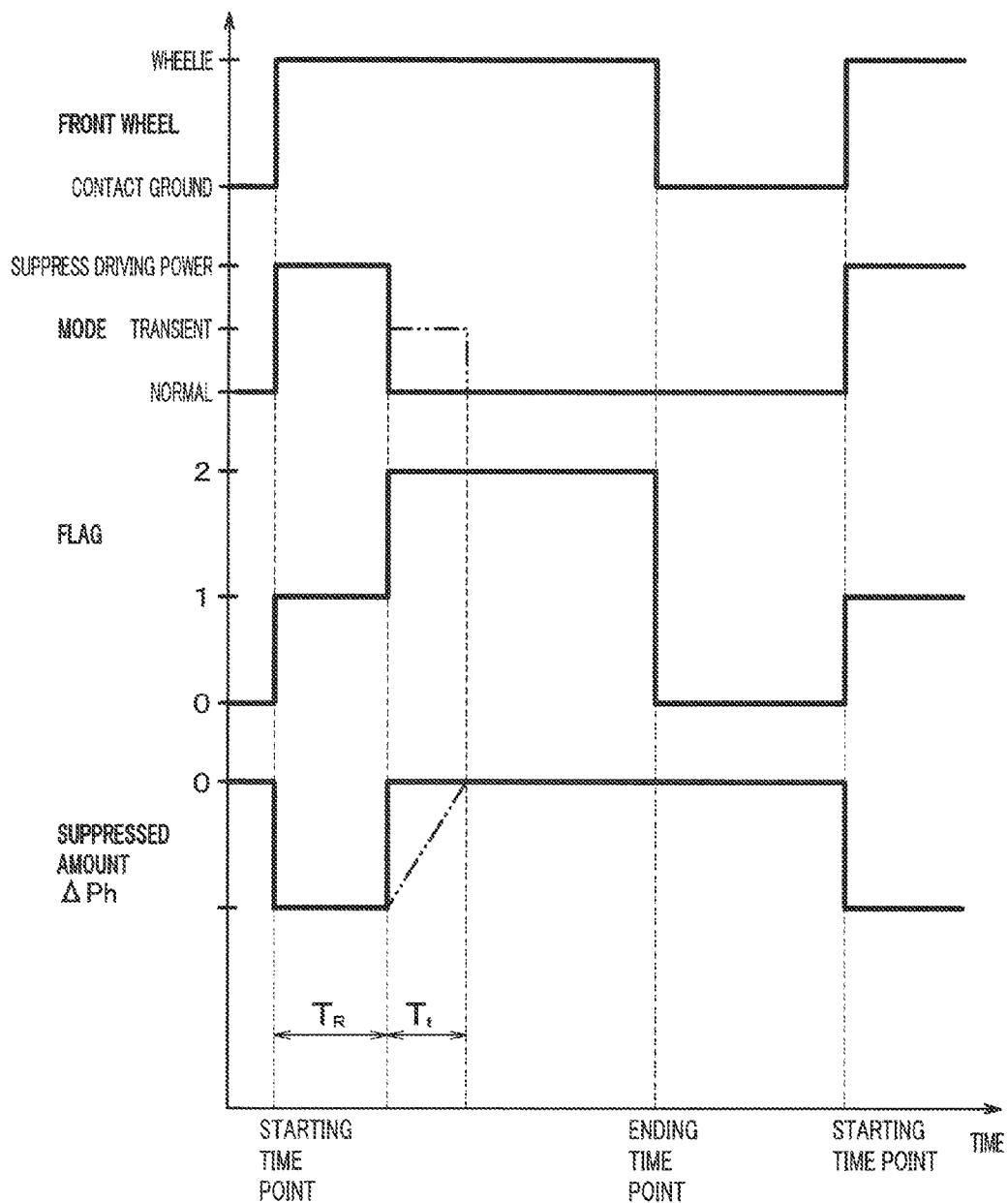
FIG. 16 is a timing chart showing an exemplary time-lapse change in a mode and a suppressed amount in a case where the process flow in FIG. 14 is executed.

FIG. 16 is a timing chart showing, from start of the wheelie until the end of the wheelie, in a case where the process flow in FIG. 4 is performed. As shown in FIG. 16, in a case where the wheelie starting condition is met and the normal mode transitions to the driving power suppressing mode, it is determined that the return condition is met when the return time $T_R$ has lapsed from the time point when the wheelie has started, even if the wheelie ending condition is not met. Thereafter, the driving power controller 65 returns to the normal mode, in which the suppressed amount $\Delta Ph$ is 0, and the suppressing of the engine driving power ends. On the other hand, after the return condition is met and the flag value becomes 2, it is determined sequentially whether or not the wheelie ending condition is met, and the process for determining whether or not the wheelie has started is not performed unless the wheelie ending condition is met. This makes it possible to avoid a mis-determination that the wheelie has started, with reference to the driving state under the state where the wheelie is occurring.

As described above, if it is determined that the return condition is not met but the wheelie ending condition is met, the driving power controller 65 returns to the normal mode. As indicated by two-dotted dashed line in FIG. 16, a transient mode for gradually reducing the suppressed amount $\Delta Ph$ to 0 for a predetermined transition time $T_1$ may be set and the engine driving power may be controlled in the transient mode, instead of returning to the normal mode promptly, if it is determined that the return condition is met. This makes it possible to lessen a fluctuation in the engine driving power during the period when the wheelie is occurring.

(Embodiment 3)

Figure 17:
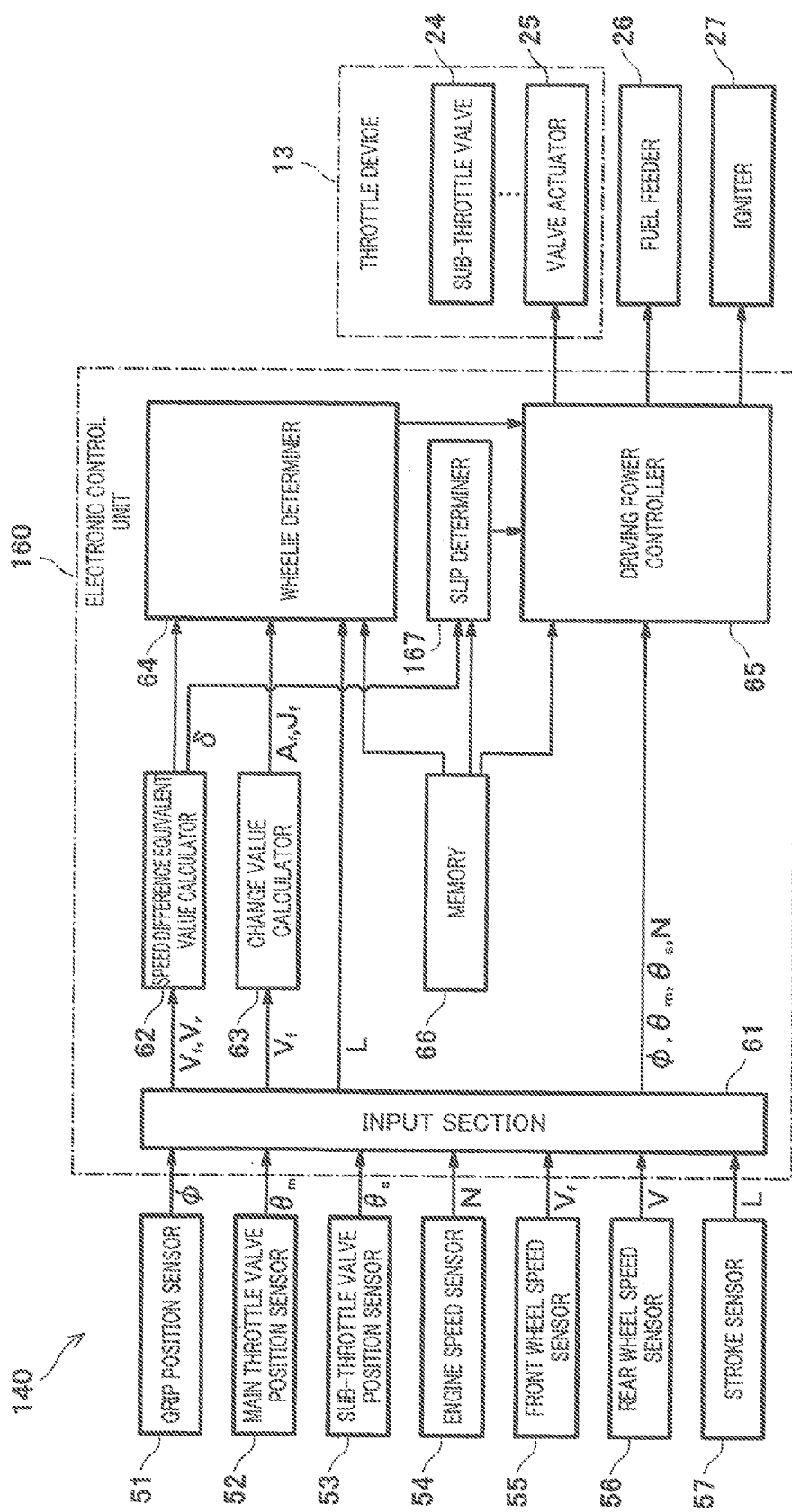
FIG. 17 is a block diagram showing a configuration of a control system according to Embodiment 3 of the present invention.

FIG. 17 is a block diagram showing a configuration of a control system 140 according to Embodiment 3 of the present invention. An electronic control unit 160 in the control system 140 in FIG. 17 is different from the electronic control unit 60 of Embodiment 1 in FIG. 3 in that a slip determiner 167 is incorporated into the electronic control unit 60. The other constituents are identical to those of Embodiment 1. They are designated by the same reference numerals and will not be described for the sake of brevity.

Referring to FIG. 17, the slip determiner 167 determines whether or not the speed difference equivalent value $\delta$ between the front and rear wheels 2 and 3, which is calculated by the speed difference equivalent value calculator 62, is not less than a slip threshold prestored in the memory 66 to determine whether or not the rear wheel 3 is slipping. The slip determiner 167 determines that the rear wheel 3 is slipping if the speed difference equivalent value $\delta$ between the front and rear wheels 2 and 3 is not less than the slip threshold. If the slip determiner 167 determines that the rear wheel 3 is slipping, the driving power controller 65 executes traction control to reduce the engine driving power. The traction control reduces the driving power transmitted from the engine 12 to the rear wheel 3, thereby allowing the rear wheel 3 to grip the road surface.

Figure 18:
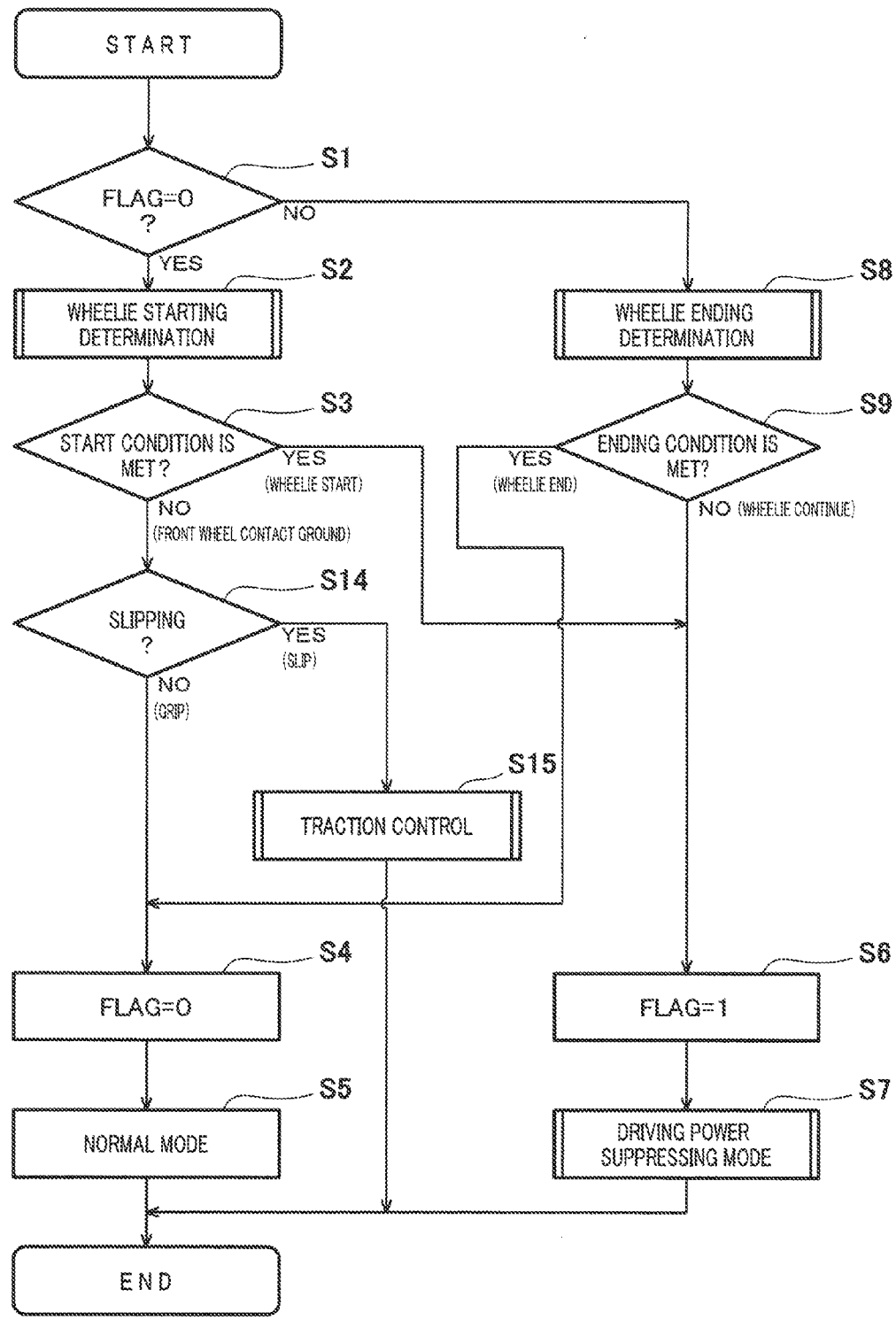
FIG. 18 is a flowchart showing a flow of a main control process executed by an electronic control unit in FIG. 17.

FIG. 18 is a flowchart showing a flow of a main control process executed by the electronic control unit 160 in FIG. 17. The process flow in FIG. 18 is different from the process flow in FIG. 5 in that a determination step (S14) is inserted between step S3 and step S4, and a step S15, performed based on a determination result from S14, is added in the process in FIG. 5. A case where the process moves from step S1 to step S8 and to step S4 or S5 is identical to that shown in FIG. 5 and will not be described for the sake of brevity.

Referring to FIG. 18, if it is determined that the flag value is 0 in step S1 (S1: YES), the wheelie determiner 64 determines whether or not the wheelie has started (S2). If it is determined that the wheelie starting condition is met (S3: YES), the flag value becomes 1 (S6), the driving power controller 65 executes the driving power suppressing control in the driving power suppressing mode (S7), and the present process flow ends. When the wheelie starting condition is met and the process flow ends in this way, a next process flow starts with the flag value being 1, and steps S1, S8, and S9 are performed.

If the wheelie starting condition is not met (S3: NO), the slip determiner 167 determines whether or not the rear wheel 3 is slipping (S14). If it is determined that the rear wheel 3 is gripping the ground (S14: NO), the flag value is maintained at 0 (S4), the driving power controller 65 continues to control the engine driving power in the normal mode (S5), and the present process flow ends. When it is determined that the wheelie starting condition is not met, the rear wheel 3 is gripping the ground, and the process flow ends, a next process flow starts with the flag value being 0, and steps S1, S2, and S3 are performed.

On the other hand, if it is determined that the rear wheel 3 is slipping (S14: YES), the driving power controller 65 executes the traction control (S15), and the present process flow ends. When is determined that the wheelie stating condition is not met, the rear wheel 3 is gripping the ground, and the process flow ends, steps S1, S2, and S3 are performed, in a next process flow.

As shown in FIG. 7, the wheelie starting condition in the wheelie starting determination (S2) may include the condition that the speed difference equivalent value δ between the front and rear wheels 2 and 3 is not less than (i.e., is greater than or equal to) the predetermined value $\delta_{Th}$. That is, the speed difference equivalent value δ between the front and rear wheels 2 and 3 is used both in the wheelie starting determination and the slip determination. For this reason, the predetermined value $\delta_{Th}$ compared to the speed difference equivalent value δ in the wheelie starting determination is preferably a positive value smaller than the slip threshold compared to the speed difference equivalent value δ in the slip determination. This makes it possible to prevent a mis-determination that the rear wheel 3 is slipping just before the wheelie starts, even though the rear wheel 3 is gripping the ground.

The wheelie starting condition may include conditions associated with the change values $A_f$ and $J_f$ of the rotational speed $V_f$ of the front wheel 2, or the condition associated with the stroke L of the front suspension 8, in addition to the condition that the speed difference equivalent value δ between the front and rear wheels 2 and 3 is not less than (i.e., is greater than or equal to) the predetermined value $\delta_{Th}$ and it may be determined that the wheelie starting condition is met if all of these conditions are met (see FIG. 7). This makes it possible to prevent a mis-determination that the wheelie has started even though the rear wheel 3 is slipping.

The slip determination (S14) and the following traction control (S15) are not executed unless a period until the wheelie ending condition is met and the flag value returns to 0, after the wheelie starting condition is met and the flag value becomes 1. This makes it possible to prevent a mis-determination that the rear wheel 3 is slipping under the state where the speed difference equivalent value δ between the front and rear wheels 2 and 3 is increasing because of occurrence of the wheelie. In addition, this makes it possible to avoid the driving power suppressing control after the start of the wheelie from interfering with the traction control executed in the case where the slip has occurred in the state where the front and rear wheels 2 and 3 are in contact with the ground.

Although the embodiments of the present invention have been described, the configuration and the process flow may be suitably altered within a scope of the invention. For example, it may be determined whether or not the wheelie has started using a front wheel rotation number, or otherwise the driving power suppressing control may be executed irrespective of the front wheel rotation number. For example, after it is determined that the wheelie has started, the engine driving power may be restricted based on an engine speed, a vehicle speed, a gear ratio (transmission gear ratio), etc. On the other hand, in the wheelie determination, the front wheel rotation number may not be used, but the driving power suppressed amount may be set using a value equivalent to a change value of the front wheel rotation number in the driving power suppressing control after it is determined that the wheelie has started, thereby suitably suppressing the engine driving power when it is determined that the wheelie has started.

The control system in the vehicle of the present invention may be applied to three-wheeled motor vehicles or four-wheeled motor vehicles as well as the motorcycle, so long as it is a rear-wheel-drive vehicle in which a wheelie may occur. The driving source in the vehicle is not limited to an internal combustion engine but may be an electric motor, or a so-called hybrid type driving source including a combination of the internal combustion engine and the electric motor.

In accordance with the embodiments of the present invention, it is possible to improve reliability of driving power control in a state where a wheelie is occurring.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A control system in a vehicle including a front wheel which is a driven wheel and a rear wheel which is a drive wheel, the control system including:
   a control unit configured to control a driving power generated in a driving source according to a driving state of the vehicle; and
   a front wheel speed sensor configured to detect a rotational speed of the front wheel;
   wherein the control unit includes:
      a wheelie determiner configured to determine whether or not a predetermined wheelie starting condition is met, based on a value detected by the front wheel speed sensor; and
      a driving power controller configured to suppress the driving power if the wheelie determiner determines that the predetermined wheelie starting condition is met,
   wherein the wheelie starting condition includes a condition that a change value obtained by differentiating one or more times with respect to time the rotational speed of the front wheel detected by the front wheel speed sensor is less than a predetermined value, and
wherein the change value is a rotational acceleration of the front wheel which is obtained by differentiating once with respect to time the rotational speed of the front wheel detected by the front wheel speed sensor and/or a rotational jerk of the front wheel which is obtained by differentiating twice with respect to time the rotational speed of the front wheel detected by the front wheel speed sensor.

2. The control system in the vehicle according to claim 1, further comprising:
a rear wheel speed sensor configured to detect a rotational speed of the rear wheel, wherein the wheelie starting condition includes another condition that a value equivalent to a value obtained by subtracting the rotational speed of the front wheel detected by the front wheel speed sensor from the rotational speed of the rear wheel detected by the rear wheel speed sensor is not less than a predetermined value.

3. The control system in the vehicle according to claim 1, wherein the driving power controller is configured to decide a suppressed amount of the driving power according to the change value obtained by differentiating the rotational speed of the front wheel detected by the front wheel speed sensor one or more times.

4. The control system in the vehicle according to claim 3, wherein the driving power controller is configured to decide the suppressed amount of the driving power according to a change value obtained by differentiating one or more times the rotational speed of the front wheel detected by the front wheel speed sensor at a time point when the wheelie determiner determines that the wheelie starting condition is met or a in a period near the time point when the wheelie determiner determines that the wheelie starting condition is met.

5. A control system in a vehicle including a front wheel which is a driven wheel and a rear wheel which is a drive wheel, the control system including:
a control unit configured to control a driving power generated in a driving source according to a driving state of the vehicle; and
a front wheel speed sensor configured to detect a rotational speed of the front wheel,
wherein the control unit includes:
a wheelie determiner configured to determine whether or not a predetermined wheelie starting condition is met, based on a value detected by the front wheel speed sensor; and
a driving power controller configured to suppress the driving power if the wheelie determiner determines that the predetermined wheelie starting condition is met, and
wherein the driving power controller is configured to decide a suppressed amount of the driving power such that the suppressed amount increases as an absolute value of a change value obtained by differentiating one or more times the rotational speed of the front wheel detected by the front wheel speed sensor, increases.

6. The control system in the vehicle according to claim 1, wherein the driving power controller is configured to suppress the driving power at a time point when the wheelie determiner determines that the wheelie starting condition is met or in a period near the time point when the wheelie determiner determines that the wheelie starting condition is met.

7. The control system in the vehicle according to claim 1, wherein
the wheelie determiner determines whether or not a predetermined wheelie ending condition is met based on a value detected by the front wheel speed sensor after the wheelie determiner determines that the predetermined wheelie starting condition is met; and
the driving power controller is configured to suppress the driving power during a period from when the wheelie determiner determines that the wheelie starting condition is met until the wheelie determiner determines that the wheelie ending condition is met.

8. A method of determining whether or not a wheelie has occurred in a vehicle including a front wheel which is a driven wheel and a rear wheel which is a drive wheel, the method comprising:
at a control unit:
detecting a rotational speed of the front wheel;
calculating a change value of the rotational speed of the front wheel; and
determining whether or not the wheelie has started based on the calculated change value,
wherein the change value is a rotational acceleration of the front wheel which is obtained by differentiating once with respect to time the detected rotational speed of the front wheel and/or a rotational jerk of the front wheel which is obtained by differentiating twice with respect to time the detected rotational speed of the front wheel, and
wherein it is determined that the wheelie has started when the change value is less than a predetermined value.

9. A method of suppressing a driving power generated in a driving source when a wheelie is occurring in a vehicle including a front wheel which is a driven wheel and a rear wheel which is a drive wheel, the method comprising:
at a control unit:
detecting a rotational speed of the front wheel;
calculating a change value of the rotational speed of the front wheel; and
deciding a suppressed state of the driving power based on the calculated change value,
wherein the change value is obtained by differentiating one or more times the rotational speed of the front wheel, and
wherein the suppressed state is decided such that the driving power is suppressed to a greater degree, as an absolute value of the change value increases.

10. The control system in the vehicle according to claim 2, wherein the wheelie determiner determines that the wheelie starting condition is met when both of the condition and the another condition included in the wheelie starting condition are met.

11. The control system in the vehicle according to claim 1, wherein the predetermined value is a positive value near zero.

* * * * *